(12) United States Patent
Jaffe et al.

(10) Patent No.: US 6,757,828 B1
(45) Date of Patent: Jun. 29, 2004

(54) INDIGENOUS AUTHENTICATION FOR SENSOR-RECORDERS AND OTHER INFORMATION CAPTURE DEVICES

(76) Inventors: Jonathan E. Jaffe, 1003 Bradford Blvd., Gallatin, TN (US) 37066; Joel D. Goldhar, 720 Foxdale Ave., Winnetka, IL (US) 60093; Michael A. Warot, 532 Florence, Hammond, IN (US) 46324

( * ) Notice: Subject to any disclaimer, the term of this patent is extended or adjusted under 35 U.S.C. 154(b) by 706 days.

(21) Appl. No.: 09/626,044

(22) Filed: Jul. 27, 2000

(51) Int. Cl.[7] .............................................. H04L 9/00
(52) U.S. Cl. ...................... 713/176; 380/200; 380/258
(58) Field of Search ................................ 713/176, 168, 713/161, 200; 380/258, 229, 200, 54, 46; 348/207.99; 382/276, 312–313

(56) References Cited

U.S. PATENT DOCUMENTS

| | | | | |
|---|---|---|---|---|
| 5,499,294 A | * | 3/1996 | Friedman | 713/179 |
| 5,504,518 A | * | 4/1996 | Ellis et al. | 725/22 |
| 5,764,770 A | * | 6/1998 | Schipper et al. | 713/176 |
| 6,253,337 B1 | * | 6/2001 | Maloney et al. | 714/38 |
| 6,269,446 B1 | * | 7/2001 | Schumacher et al. | 713/176 |

* cited by examiner

*Primary Examiner*—Kim Vu
*Assistant Examiner*—Hosuk Song
(74) *Attorney, Agent, or Firm*—Welsh & Katz, Ltd.

(57) ABSTRACT

A method and system of authentication for sensor-recorders and other information capture devices is disclosed. In accordance with aspects of the current invention, a digital sample of the environment is obtained. From this sample and at least one parameter representative of at least one condition under which the sample was generated, a digital signature is created. This signature is stored in memory with the sample to be checked at a later time for authenticity. The file is checked for authenticity by generating a second signature from the file and comparing that signature to the original signature. If the two signatures are identical, the sample is considered authentic and if the two signatures are different, the sample cannot be authenticated.

6 Claims, 21 Drawing Sheets

GPS IS GEOPOSITIONING SYSTEM
C-VIBE IS THE COUNTER VIBRATION UNIT
RPY IS ROLL-PITCH YAW DETECTION
CAMID IS CAMERA IDENTIFICATION
SEQNUM IS SEQUENCE NUMBER

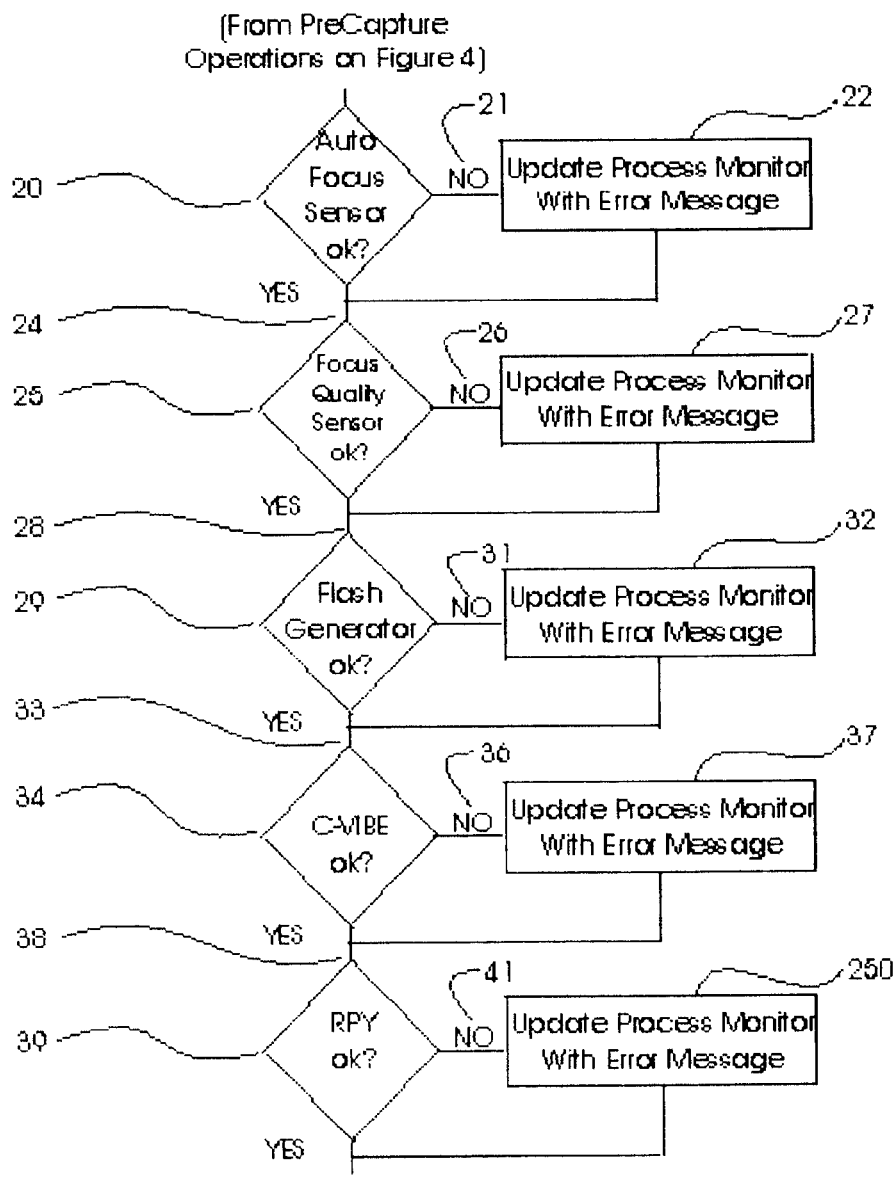
FIGURE 4A1

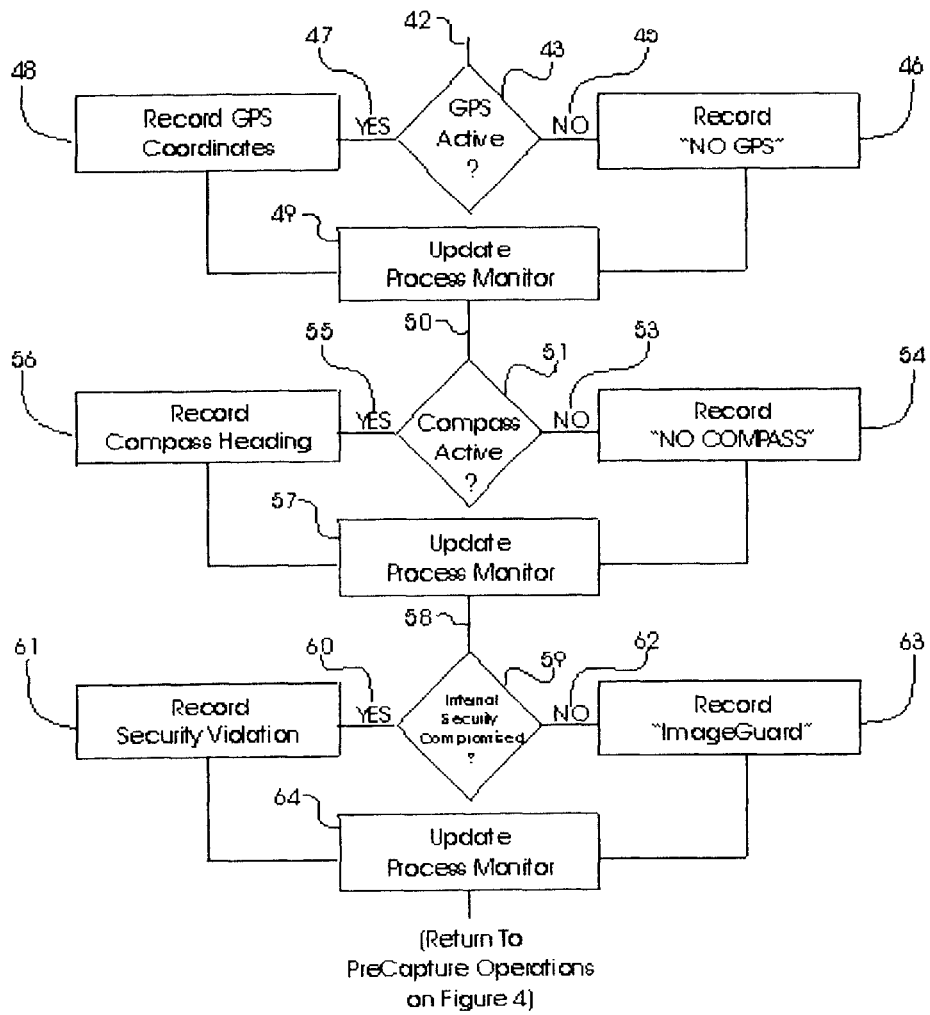
FIGURE 4A2

110 — Poll Sensor
111 — Append GPS Values to Image
112 — Append Auto Focus Value to Image
113 — Append Focus Quality Values to Image
114 — Append Flash Value to Image
115 — Append C-VIBE Value to Image
116 — Append RPY Values to Image
117 — Append Compass Value to Image
118 — Append Zoom Value to Image
119 — Append Cam ID to Image
120 — Append Sequence Number to Image
121 — Append Random String to Image
122 — Append File Type to Image
123 — Append Security Value to Image (Continued on Figure 6 B)

FIGURE 6

END OF POST CAPTURE OPERATIONS

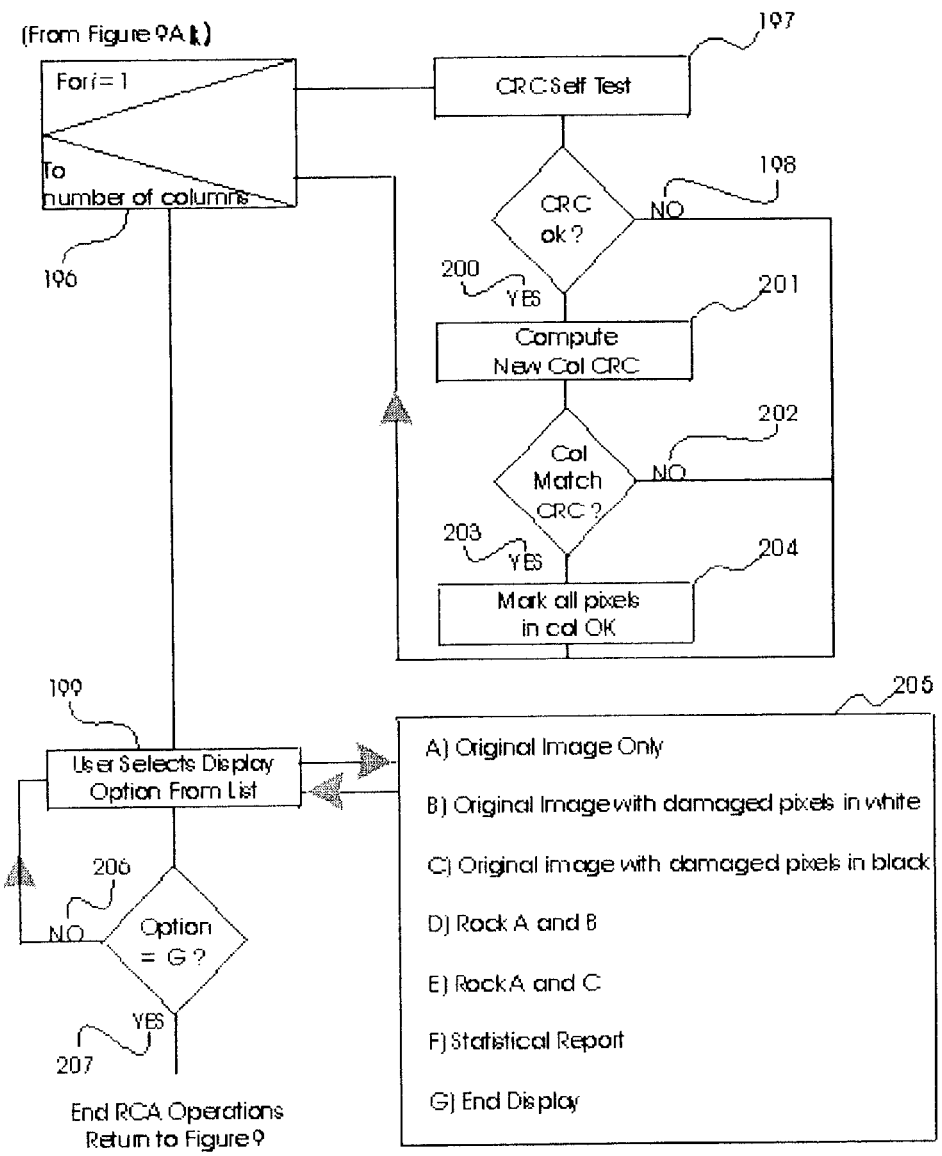
FIGURE 9A2

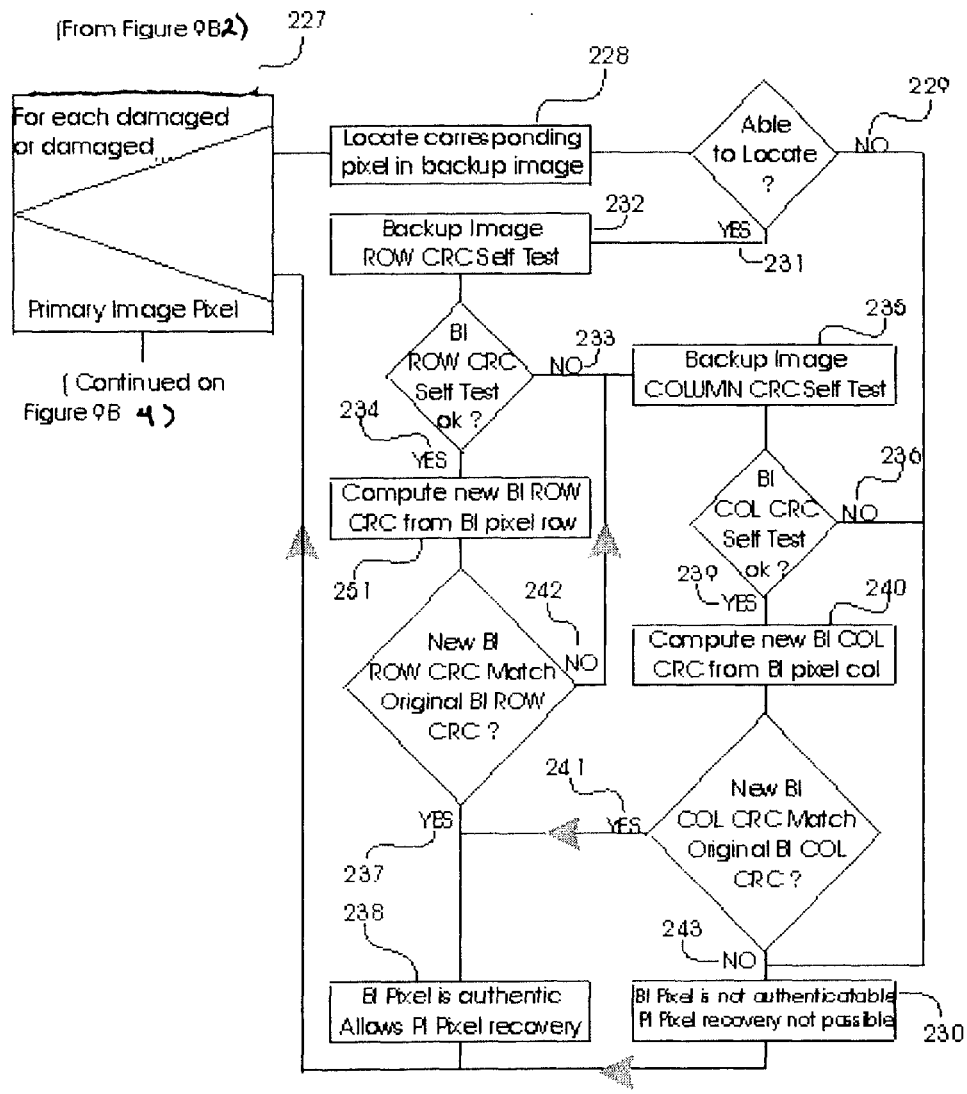
FIGURE 9B3

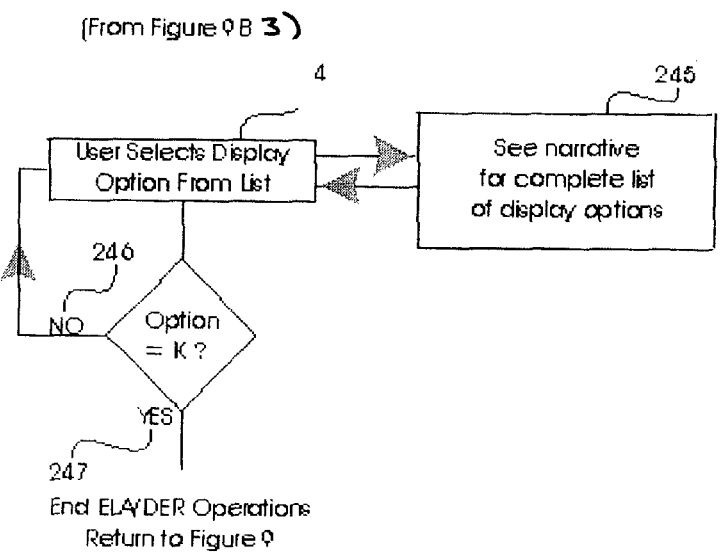
FIGURE 9B4

INDIGENOUS AUTHENTICATION FOR SENSOR-RECORDERS AND OTHER INFORMATION CAPTURE DEVICES

FIELD OF THE INVENTION

The present invention generally relates to a method and apparatus for acquiring and recording a sample of an environment and, more particularly, to a method and apparatus that allows the stored recording to be verified as an authentic, unaltered sample of the environment.

BACKGROUND OF THE INVENTION

One purpose of the present invention is to provide a solution to the problem of either deliberate or inadvertent alteration of recordings. In this context, "recordings" refers to all recordings, including digital images, data files, and the more common audio recording.

Photographs, movies and printed materials have historically been regarded as media that can be trusted to be authentic copies of the original. Early attempts at alteration of photographs for the purposes of revisionist history were almost comically detectable with five people sitting at a table, but six pairs of legs underneath. Hand written, permanently bound, notebooks are used in research laboratories for their resistance against attempts at alteration. Recent technological advances have brought the ability to alter images to the neophyte level. When a master employs the advanced technology the alterations are almost completely undetectable. For this reason digital photography is seldom used in situations when "chain of custody" requirements exist to protect the authenticity of a recording be it photographic, written or auditory. For example, the picture of an accident scene could be altered to show bottles of alcoholic beverages around the driver, even if those bottles hadn't really been there when the picture was taken, but were a post accident embellishment.

A digital camera with apparatus for authentication of images produced from an image file is disclosed in U.S. Pat. No. 5,499,294. Referring to FIG. 3A of U.S. Pat. No. 5,499,294, a block diagram of a system including a digital camera is shown that produces a file image with a digital signature. A device specific decryption key is required to allow a file image to be authenticated. Furthermore, in order to determine whether a file image is authentic, the person performing the authentication must know which camera took the picture; due to the fact that each camera includes a unique private encryption key.

SUMMARY OF THE INVENTION

It is desirable to provide an improved method and system for determining the authenticity of a sample of an environment. A digital signature is created that is a function of both the sample of the environment itself, as well as at least one parameter that is representative of at least one condition under which the digital sample was acquired. The sample is stored in memory together with the at least one parameter and the digital signature. Authenticity of the stored image is determined by creating a new signature from the stored image and at least one parameter, and then comparing the two signatures to determine if they are the same.

Such a method and apparatus is advantageous for several reasons. First, one aspect of the present invention is that it is not necessary to know what device sampled the environment because it only is necessary to have the stored sample, parameters, and signature. Second, encryption is not required for authentication purposes, thereby allowing information storage devices to be manufactured in a more cost effective manner.

Other features and advantages of the present invention will become apparent from the following description.

DESCRIPTION OF THE DRAWINGS

FIG. 4A1 is a flow chart of the Check Additional Inputs for Pre Capture Operations in FIG. 4;

FIG. 4A2 is a continuation of the flow chart from FIG. 4A1;

FIG. 6 is a flow chart of the Post Capture Operations from FIG. 3;

FIG. 9A1 is a flow chart of the RCA Operations from FIG. 9;

FIG. 9A2 is a continuation of the flow chart from FIG. 9A1;

FIG. 9B1 is a flow chart of the ELA/DER Operations from FIG. 9;

FIG. 9B2 is a continuation of the flow chart from FIG. 9B1;

FIG. 9B3 is a continuation of the flow chart from FIG. 9B2;

FIG. 9B4 is a continuation of the flow chart from FIG. 9B3;

DETAILED DESCRIPTION OF THE PREFERRED EMBODIMENTS

One aspect of the present invention is the concept and method of indigenous authentication. That is, a family of devices to create recordings with material to validate its authenticity. One embodiment of the present invention relates to digital photography where an image is authenticated as a whole. An intermediate version allows the authentication of less than the whole. An advanced version allows for recovery of damaged (altered from its original state) elements. Additional inputs including, but not limited to, date, time, latitude, longitude, altitude, roll, pitch, yaw, and compass heading can be made part of the image as well as the status of camera elements including camera identification, image sequence number, flash status, lens zoom factor, counter vibration status, focus status and focus quality. This additional information becomes part of the recording and can also be authenticated.

The present invention is applicable to information capture scenarios other than digital cameras such as self-authenticating identification documents, an extension of the notary public system, or electronic laboratory notebooks to replace the handwritten ones mentioned above. Once established as a trustworthy source; the indigenous authentication concept can be extended further for recording quality control, legal requirements and financial instruments.

A key to verifiable authenticity is to insure that the authentication information generation is tightly coupled to the sensor set and recorder. There can be nothing that can possibly alter the recording before the authentication information is generated. Authentication using this method requires neither comparison files, nor conventional or reverse encryption. The strength of authentication is increased by using one-time random elements and by the use of a random string, regenerated under user control. Although not required for basic operation, the resulting recording can be optionally encrypted to conceal the information. The absence of required conventional encryption or reverse encryption eliminates the need for a public registrar or record keeping relating to the management of decryption keys. As the authentication is indigenous there is no requirement to identify which recorder was used.

Figure 2:
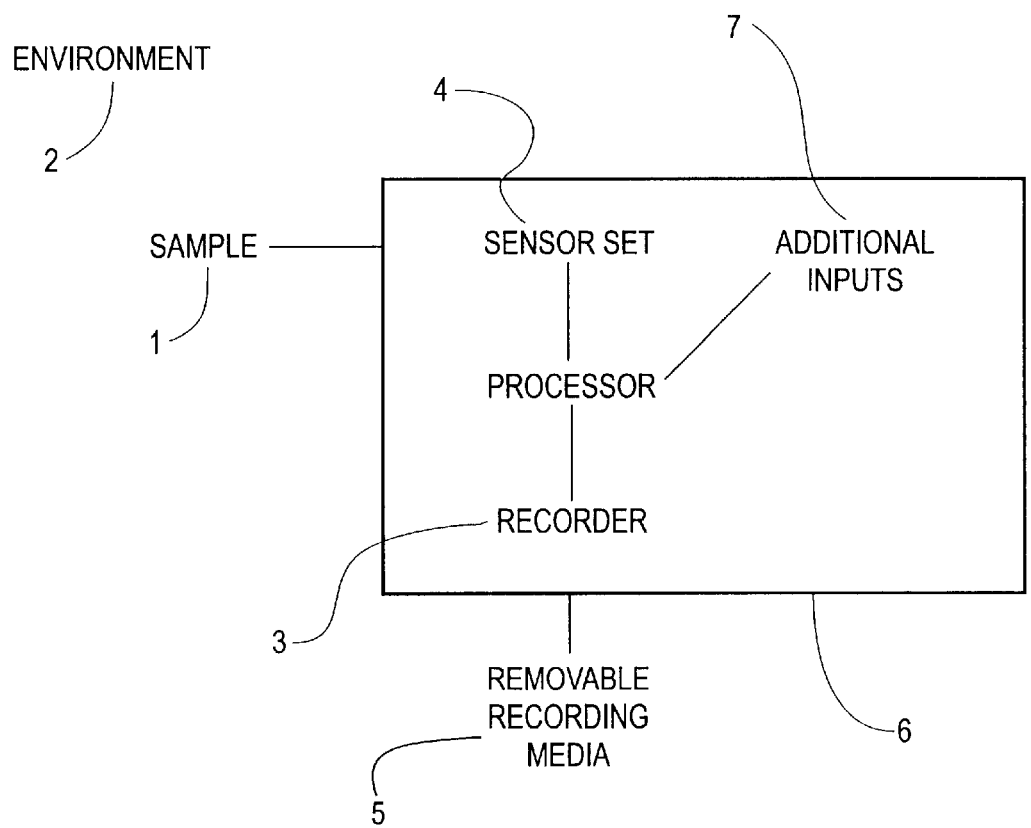
FIG. 2 is a schematic diagram of a self-contained digital camera that incorporates certain aspects of the present invention.

Referring to FIG. 2, an environment 2 can be sampled 1 in a variety of formats. In recording a single sample of a visual environment, a single frame optical recorder, generally known as a camera, is used. The sample taken, known as a "photograph," has been recorded on positive transparency films (slides); negative transparency films (negatives); opaque or translucent prints; and more recently as digital files.

In recording a continuous sample of a visual environment, a continuous optical recorder such as a video camera, movie film camera or a digital movie camera is used. These samples, generically called "movies," have been recorded on transparency film, videotape and more recently as digital files In recording a sample of an auditory environment, a continuous audio recorder such as a tape recorder or a digital recorder is used. These samples, generally called "recordings," have been recorded on a wide variety of wire, tape and digital files.

With the development of sensors and recorders, the recording of samples of taste, touch and smell can be accommodated in the same generic model. Also, samples are not limited to the five human senses. The method for authentication and verification disclosed in the present application can be used on samples taken from any sensor set including, but not limited to, the full range of physical, chemical, and spectral phenomena.

To ensure authentication, additional inputs 7 other than the sensor set 4 are not accessible to the user without detection as shown in FIG. 2. To accomplish this the additional inputs are shown inside the device physical boundary Analog recorders may also be incorporated into this system through the use of analog to digital converters.

One use of the present invention is to create an image or data file that is considered "trustworthy" in any situation where proof of authenticity is necessary. This includes, but is not limited to, legal evidence, insurance claims, project management, scientific research, invention, quality control, identification, intelligence gathering, purchasing, command and control, law enforcement, document and image transmission.

The increasingly rapid transition to digital capture, analysis, storage, transmission, distribution and use of information, using increasingly sophisticated hardware and software for creation and capture tools, makes it increasingly difficult to accept any image or data file as authentic on its face.

With the continued growth of personal computers in society and the increasing use of the internet, electronic miscreance including deliberate fraud and inadvertent changes caused by transmission or storage errors are on the rise. The need for authentication parallels that rise to counter proliferation of altered files. The need for authentication also increases with the potential damage an altered file might cause. For example, contracts, purchase orders, legal decisions, electronic bill payments, electronic invoices, quality control information, blue prints, designs: all of these could cause great harm if an altered version were believed to be authentic. It is not unreasonable to presume that indigenous authentication might become the norm, in an attempt to prevent or derail any possible malicious acts by miscreants.

One aspect of the present invention allows generally complete mitigation of the threat of undetected image alteration and subsequent use of the altered image for purposes of deliberate or unknowing deception. Thus, a framework is provided for future devices to accomplish similar ends and provide a solution to an ever more troubling social and economic problem, namely the eroding credibility of photographic images, especially in law enforcement where the images may become evidence in a legal proceeding.

Figure 1:
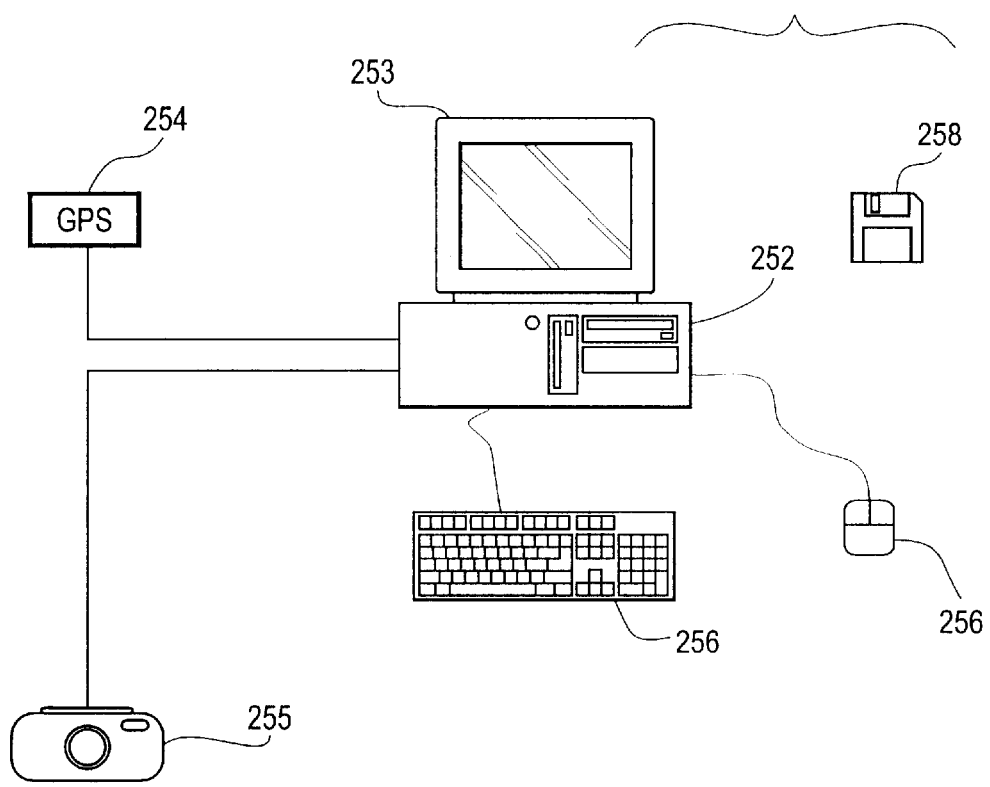
FIG. 1 is a schematic diagram of one embodiment of the present invention showing a digital camera, a personal computer, and an external GPS unit.

Referring to FIG. 1, a schematic diagram of one embodiment of the present invention showing a digital camera, a personal computer, and an external GPS unit is shown. A general purpose microcomputer 252 is used to simulate the processor 157 and its programming. The mouse 256 and keyboard 257 are used to simulate the user's setting of controls (See FIGS. 2A, 9 10 11 12 13). The microcomputer's monitor 253 is analogous to the process monitor 8 shown in FIG. 2A. An external geographic positioning system 254 (GPS) is used instead of an internal 44 one. An externally connected digital camera 255 simulates the lens sensor set 73 auto focus 19 and flash generator 30. The microcomputer's 252 floppy drive (not shown) performs the function of the recorder 142 and the 3.5" floppy disk 259 is the removable storage media 141.

Figure 2A:
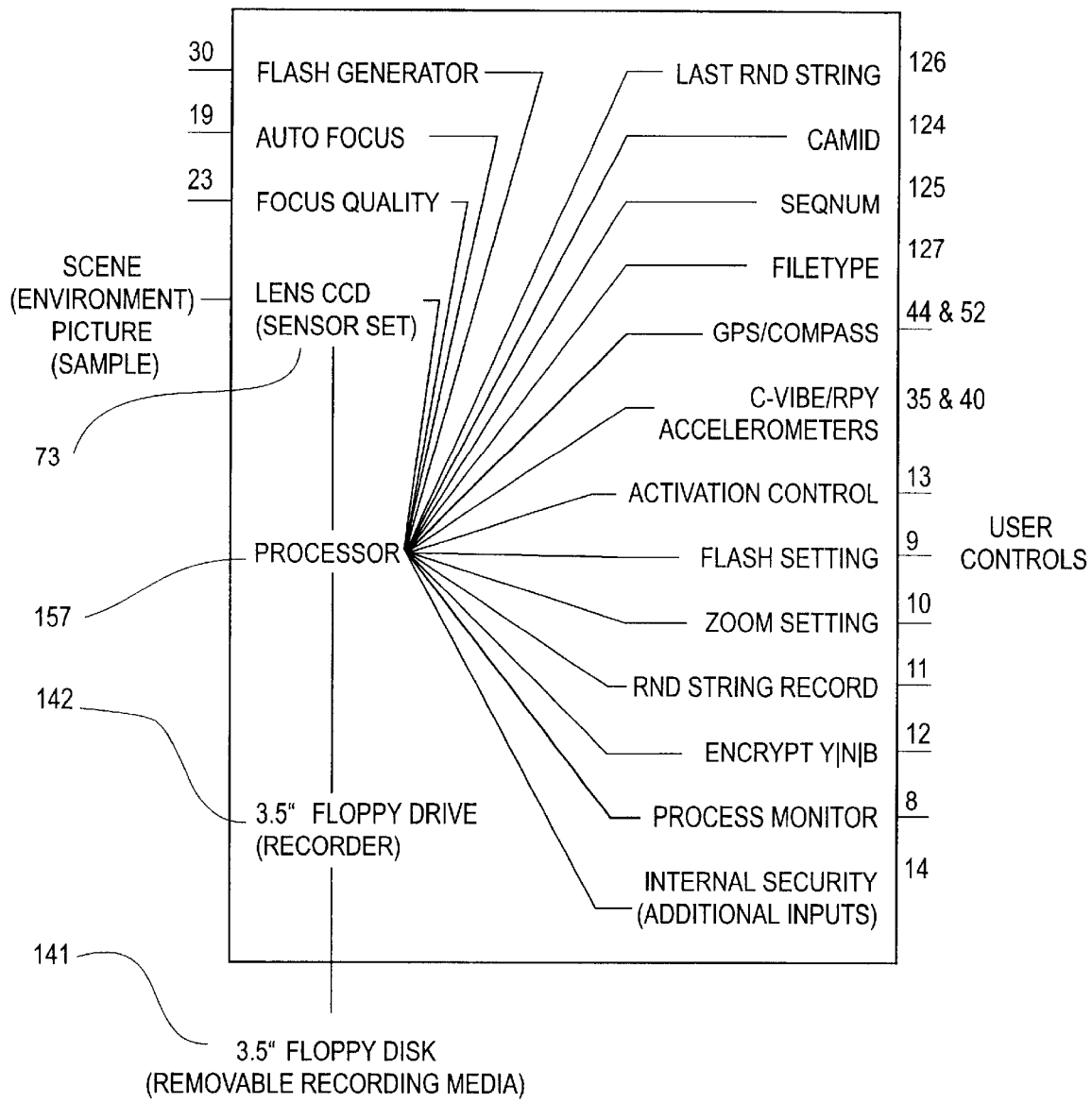
FIG. 2A is a detailed schematic diagram of a self-contained digital camera that incorporates certain aspects of the present invention.

Referring to FIG. 2A, a device model for a single frame optical recorder, more commonly known as a camera, is shown. FIG. 2A does not show the externally supplied source or internal batteries that must power this device. In this camera, the user may access the process monitor 8. For approximate aiming, access may be gained through a shaft, parallel to the axis of the lens. Access to the process monitor 8 may also be gained through a processor 157 controlled recreation of the current scene. Indicators appear on the process monitor indicating flash status, zoom status, etc.

Operators may aim the device, activate the device, and set user controls, including but not limited to, flash 9 zoom 10 random string recording (RSR) 11 or optional encryption 12. During the operation of the camera, internal security 14 is monitored to detect the integrity of the tight coupling of the sensor set and the recorder 6.

Figure 3:
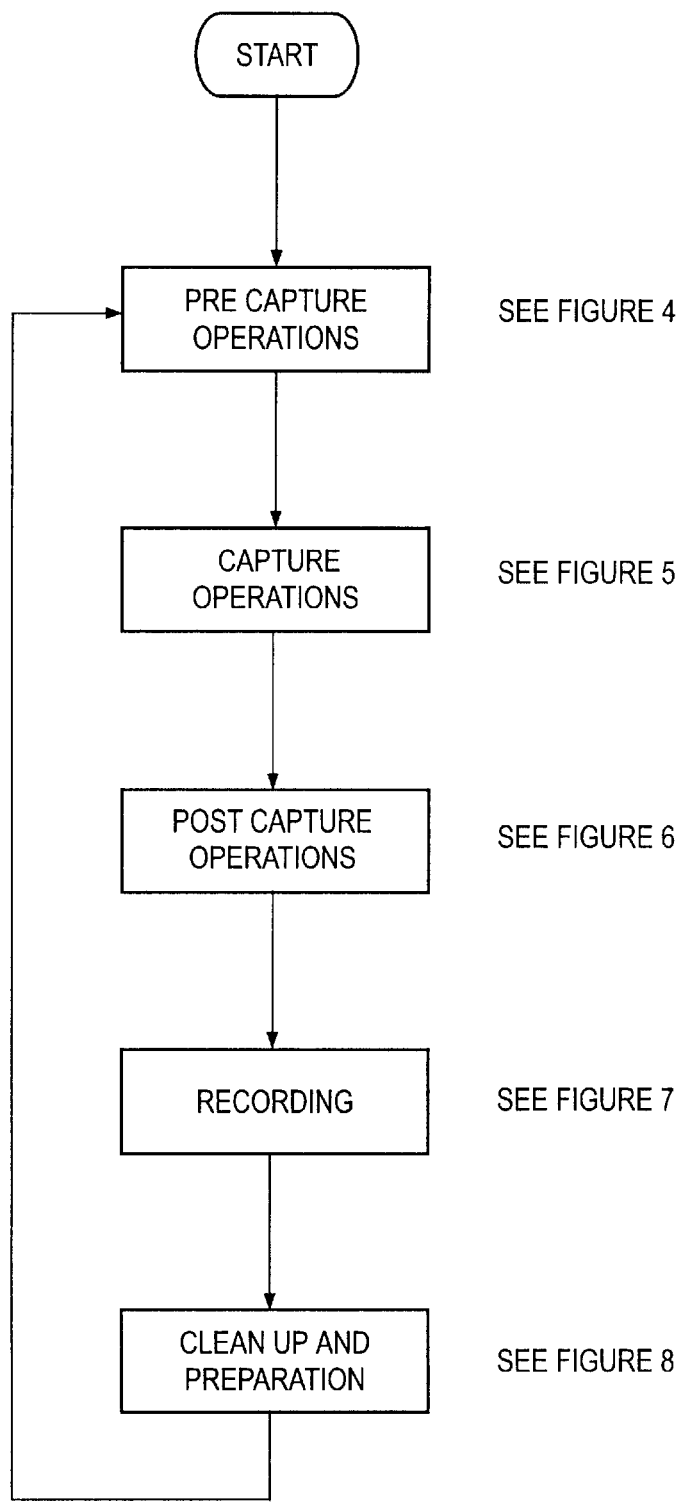
FIG. 3 is a flow chart of an operational sequence according to a first embodiment of the present invention.

Referring to FIG. 3, when the processor 157 receives an activation signal, the multi phase operating cycle proceeds through the pre capture, capture, post capture, recording, clean up and preparation operations before returning to the pre capture phase. To reduce the time within each phase, parallel processing and other engineering techniques are used.

Figure 4:
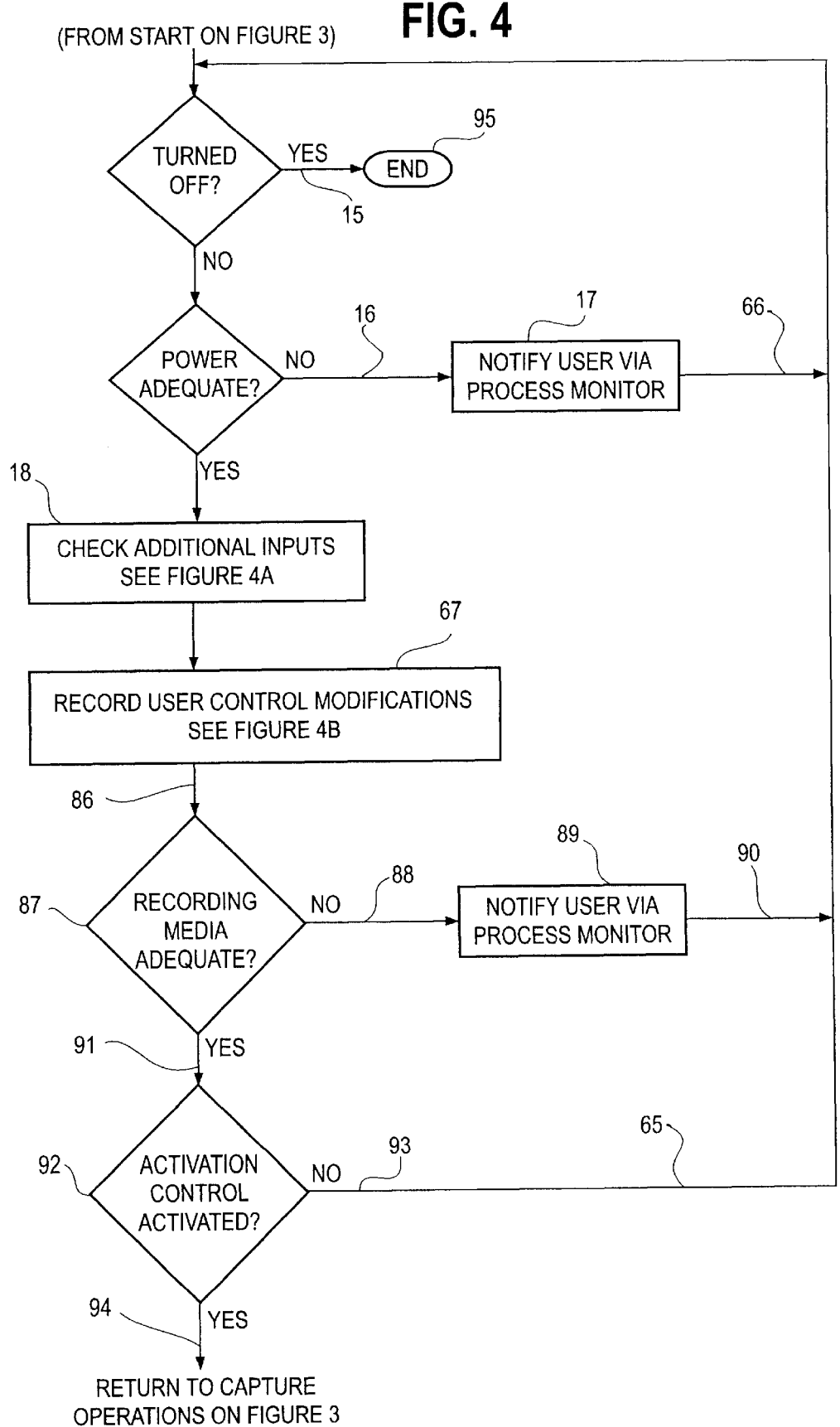
FIG. 4 is a flow chart of the Pre Capture Operations from FIG. 3.

Referring to FIG. 4, the pre capture sequence is the most common operating phase of the unit. The device cycles in the pre capture operation 65 until activated by user control 13 or turned off 15 in preparation for normal termination 95. If the device is turned on and inadequate 16 power is present to complete the operating cycle, the user activation will have no effect. An indication 17 is given to the user through the process monitor and no further processing is completed 66.

If sufficient power is present to complete the operating cycle, the additional inputs and components are checked. Referring to FIG. 4A 1 the auto focus 19 sensor and processor are then checked 20. If a malfunction 21 is present the process monitor 8 will be updated with an error message 22 to inform the user.

Independent of the auto focus's status, processing continues checking the focus quality sensor 23 the flash generator 30 counter vibration unit (C-VIBE) 35 and the roll, pitch, yaw (RPY) unit 40. These tests are performed in order (20, 25, 29, 34 and 39) independent of resulting status. At each stage, if a malfunction is present, the process monitor is updated with an error message to inform the user (27, 32, 37 and 250).

Referring to FIG. 4A2 the status processing continues 42 with a check 43 of the global position system (GPS) unit 44. If there is a malfunction 45 the value "NO GPS" is recorded 46. If no malfunctions 47 are present, the current GPS coordinates and other GPS information are recorded 48 and the process monitor 8 is updated 49 with an error message or the current coordinates.

Independent of the GPS status, processing continues 50 with a check 51 of the internal compass 52 If a malfunction 53 is present, the value "NO COMPASS" is recorded 54. Otherwise 55 the current compass heading is recorded 56 and the process monitor 8 is updated 57 with an error message or the current heading.

Independent of the compass status, processing continues 58 with a check 59 of the internal security system 14. If there is a breach of security 60 the violation is recorded 61. Otherwise 62 the value "ImageGuard" is recorded 63 and the process monitor 8 is updated 64 with the violation or "ImageGuard"

Figure 4B:
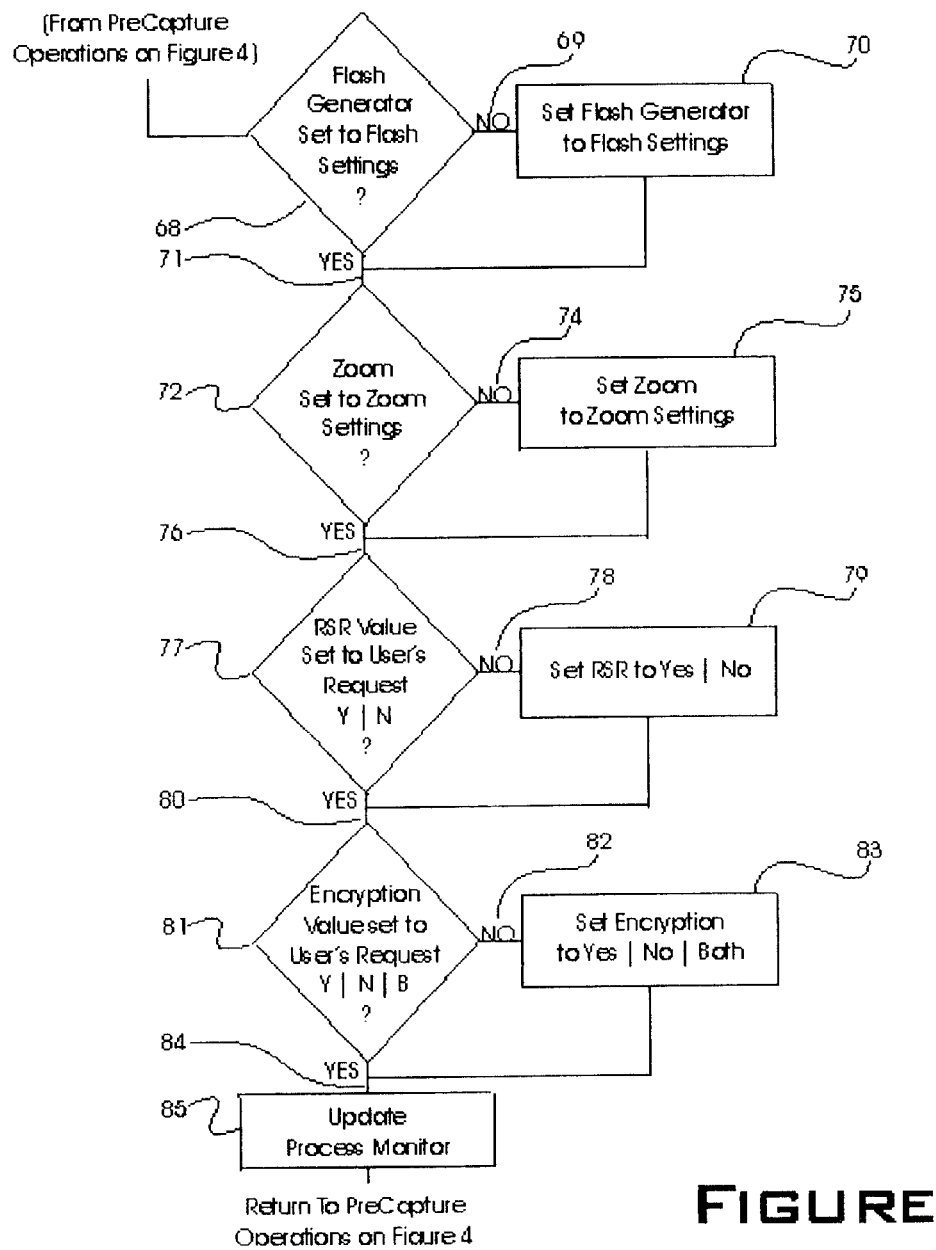
FIG. 4B is a flow chart for recording the user controls during the Pre Capture Operation.

Referring to FIG. 4, after the additional inputs and components are checked 18 the user control modifications are recorded 67. Referring to FIG. 4B, the current setting for the flash generator 30 is checked 68 against the flash settings 9 provided by the user. If not identical 69 the setting for the flash generator 30 is set 70 to that provided by the user.

The user's zoom setting 10 is then checked 72 against the zoom setting of the lens 73. If not identical 74 the setting for zoom 73 is set 75 to that provided by the user. The current random string record (RSR) value is then checked 77 against the setting 11 provided by the user. If not identical 78 the RSR value is set 79 to that provided by the user. The two possible values are "Y" for "Yes, record a new random string with the next image" and "N" for "No, don't record a new random string with the next image."

The current encryption value is then checked 81 against the encryption value 12 provided by the user. If not identical 82 the current encryption value is set 83 to that provided by the user. The three possible values are "Y" for "Yes, produce an encrypted image only", "N" for "No, don't produce an encrypted image, produce an unencrypted image only" and "B" for "Produce both an encrypted image and an unencrypted image." During this process the process monitor. 8 is updated 85 to reflect any changes made.

Referring to FIG. 4, once the user control modifications are recorded 67 processing continues 86 with a test 87 for adequate recording media. If there is inadequate recording media 88 the process monitor 8 is updated 89 with an error message and no further processing is completed 90 past this point.

After the test dealing with adequate recording media is completed 91 all pre capture operations are complete. A test 92 is made for the status of the activation control 13. If the control is not active 93 processing is cycled 65 and if active, processing continues 94 with capture operations.

Figure 5:
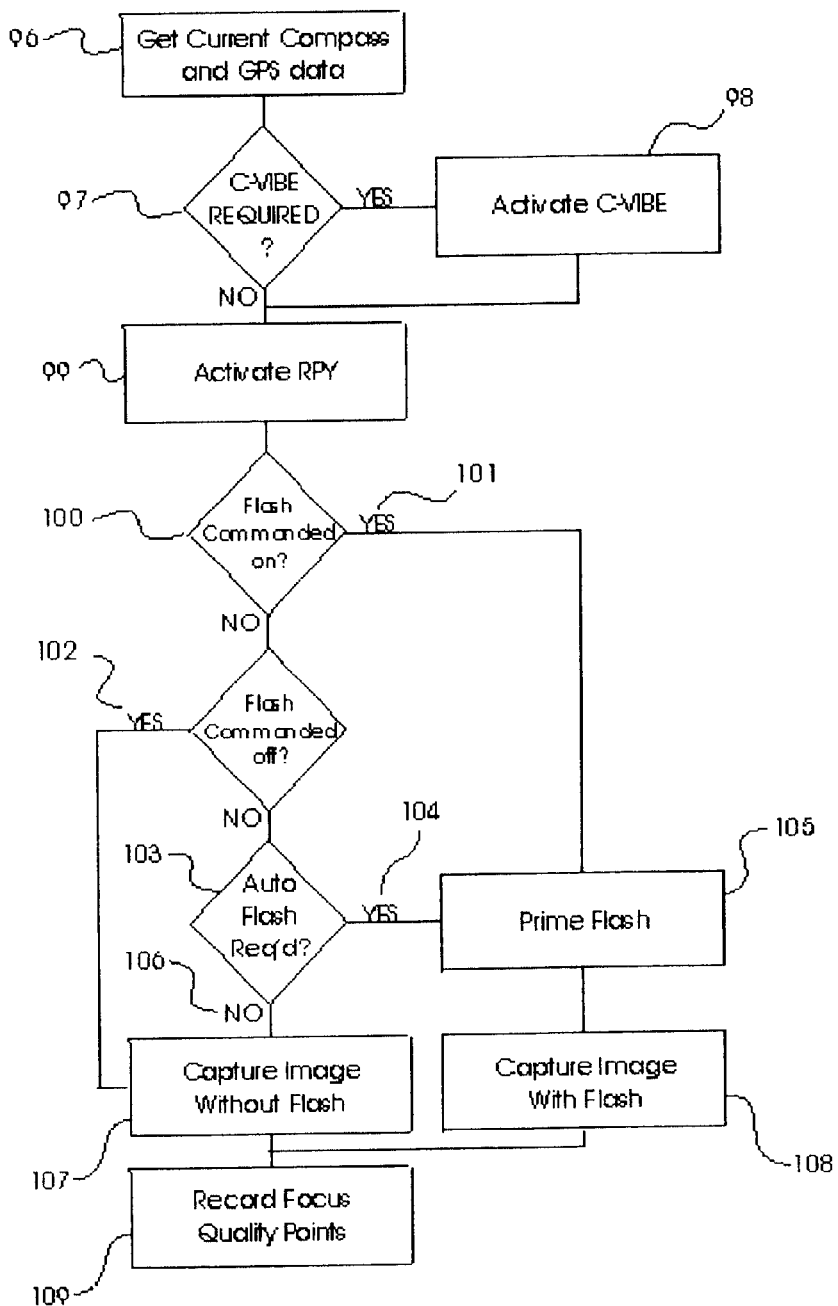
FIG. 5 is a flow chart of the Capture Operations from FIG. 3;.

Referring to FIG. 5, once the user activation control 13 is active, processing moves from pre capture operations (see FIG. 4) to capture operations.:(see FIG. 5) Current values are acquired 96 from the GPS and:Compass system. If the GPS is not, active 45 the "NO GPS" value 46 is recorded. If the GPS is active 47 the GPS coordinates 48 are recorded as is the current date and time. If the Compass, is active 55 the current heading is recorded and if not active 51, the "NO COMPASS" value 54 is acquired.

At this point, if required 97 the counter vibration unit (C-VIBE) is activated 98 to counter vibration. The roll, pitch and yaw (RPY) sensors are activated 99 and the need to prime 105 the flash unit is determined. A test is made for the user commanding the flash on or off 100. If the flash is commanded on 101 or auto flash detects 103 the requirement 104 for a flash, the flash is primed 105 and the image is captured with flash 108. Otherwise the image is captured without a flash 107.

Focus quality points are detected 109 by accessing the focus quality additional input 23. The number of focus quality points is selected, and the maximum range and minimum range are recorded. Here the camera uses either sound ranging, or another technology to measure depth of field. This procedure is required for auto focus and would detect the reproduction of a picture. This procedure also reports the number of points with differing ranges as well as the closest and farthest focus quality points from the camera. For example, "10 p 1 m Inf" would mean 10 points of differing depth, the nearest being one meter, the farthest is infinity.

Referring to FIG. 6, once the image has been captured (see FIG. 5) processing moves to post capture operations. First the CCD (or other sensor) is polled 110 to gather the image and pre pare it for recording. The GPS values for latitude, longitude, altitude, date, time, and satellites used for the positioning; that were previously acquired 96 are then appended 111 to the image. If the GPS was not functional 45 the "NO GPS" value 46 is appended 111 to the image. The AutoFocus status; number of focus quality points 109; maximum range and minimum range; flash value (commanded on, commanded off, auto-flash required, or auto-flash not required); counter vibration value (active 98 or not); roll, pitch and yaw (RPY) values; recorded compass heading 96; lens 73 zoom setting; camera identifier (CamID 124 set by the factory and unalterable by the user); current image sequence number 125; current random string 126; and file type (127 set by the factory and unalterable by the user) are all appended to the image. If internal security is compromised 60 a security violation 61 is appended 123 to the image. Otherwise the "ImageGuard" value is appended 123 to the image.

Figure 6B:
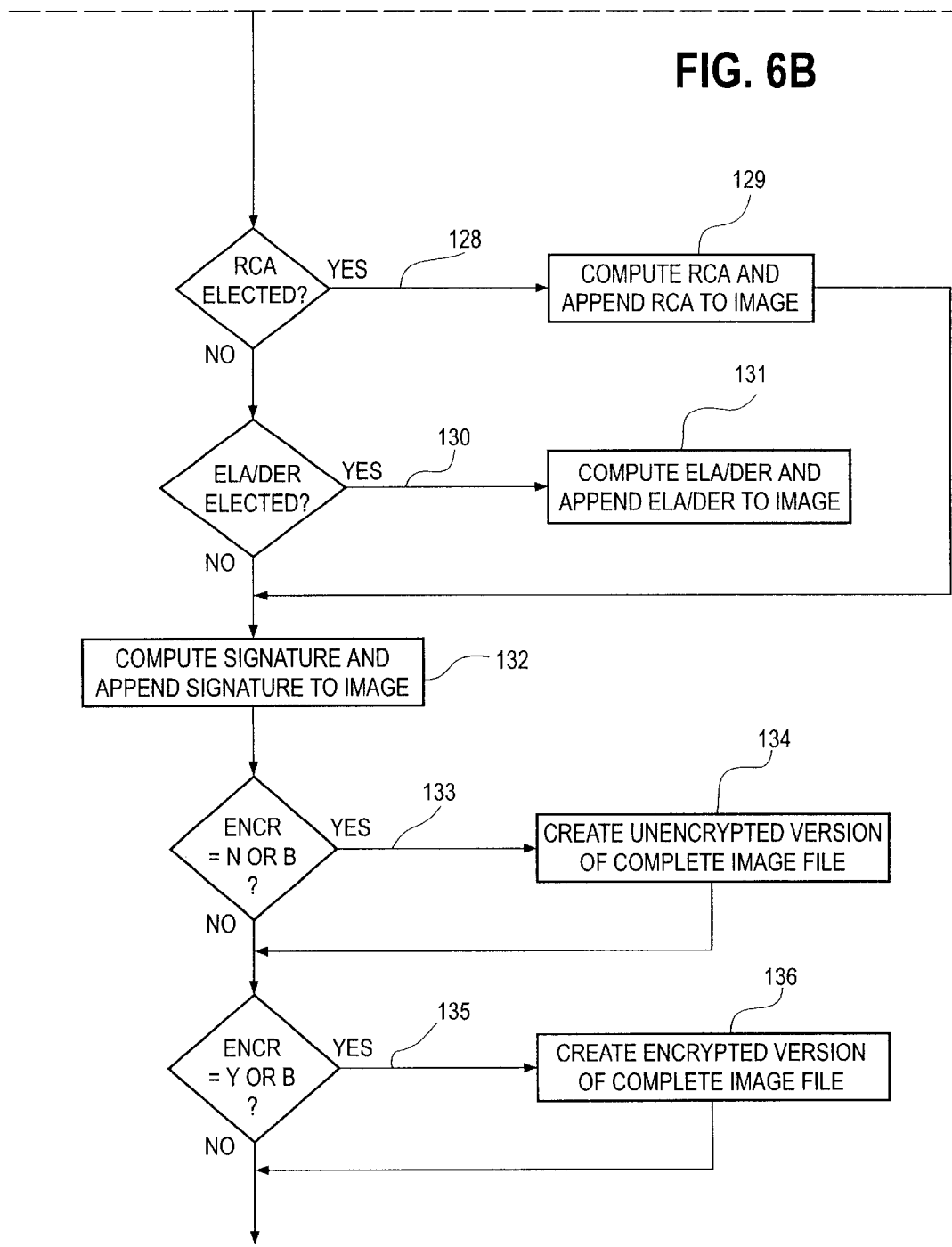
FIG. 6B is the continuation of the flow chart from FIG. 6.

Referring to FIG. 6B, there are three levels of authentication and damaged element recovery. The initial level is total image authentication (TIA). At this level only the entire image is authenticated or not. The second level is row/column authentication (RCA) where each row and column of the picture elements (pixels) can be authenticated independently. Under RCA, less than the whole image can be authenticated. The third level is elemental level authentication (ELA) and damaged element recovery (DER).

Under the ELA structure, each and every single pixel can be authenticated independently. If a single pixel fails authentication (damaged) there are structures added to the image in the post capture operation which provide multiple methods of determining the original value of the damaged pixel. This is called damaged element recovery (DER). Initially the level of authentication and damaged element recovery is to be set at the factory so that no affiliated user control (9, 10, 11, 12 and 13) is shown. There can be only one level of authentication (TIA, RCA, ELA/DER) active per use. (See FIG. 9 "Authentication Sequence" and more on authentication.)

If RCA is elected 128 the RCA structures and values are computed and appended 129 to the image. If ELA/DER is elected 130 the ELA/DER structures and values are computed and appended 131 to the image. The signature protocol used in - this device is the commercially available MD5 but the signature protocol is not limited to the MD5. The digital signature 132 which is a function of the signature protocol (SP) being used and the block, is computed and made part of the file. (SIGNA=$f$ (SP (Block))) The Block 144 is the digital data composed of the image and optionally: additional information, the camera id, the random string, the camera decryption key, and the RCA and ELA/DER structures and values.

If the user has elected 133 no encryption, or both encrypted and unencrypted, as set by the user control 12 and evidenced by the encryption value 83 then an unencrypted version of the complete image file is created 134. If the user has elected 135 encryption, or both encrypted and unencrypted, as set by the user control 12 and evidenced by the encryption value 83 then an encrypted version of the complete image file is created 136.

Figure 7:
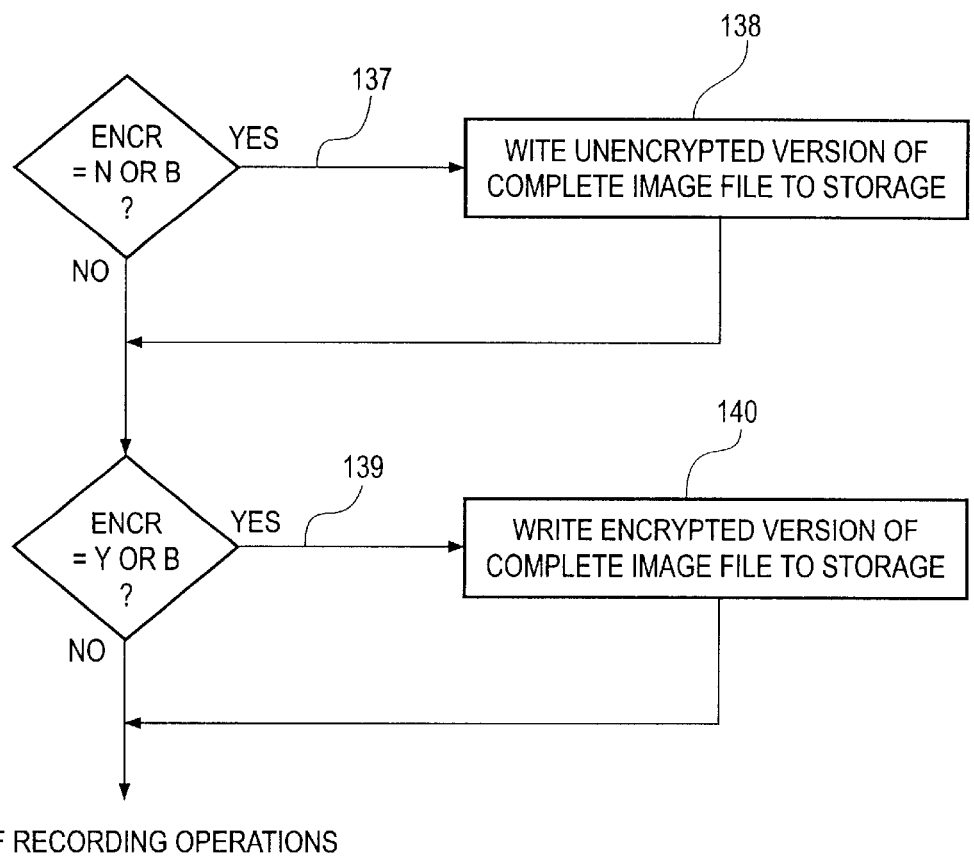
FIG. 7 is a flow chart of the Recording operation from FIG. 3.

Referring to FIG. 7, if the user has elected 137 no encryption, or both encrypted and unencrypted, as set by the user control 12 and evidenced by the encryption value 83 then an unencrypted version of the complete image file is written 138 by the recorder 142 on the recording media 141. If the user has elected 139 encryption, or both encrypted and unencrypted, as set by the user control 12 and evidenced by the encryption value 83 then an encrypted version of the complete image file is written 140 by the recorder 142 on the recording media 141.

Referring to FIG. 2A, a 3.5" floppy drive 142 and removable 3.5" floppy diskette 141 is shown as the recorder and recording media. Other available recording options include flash RAM with removable memory modules, and storage not internal to the device via infra red, serial, Ethernet, Token Ring, parallel, universal serial bus (USB), firewire or other communication mode to either a single computer or a network of computers.

Figure 7A:
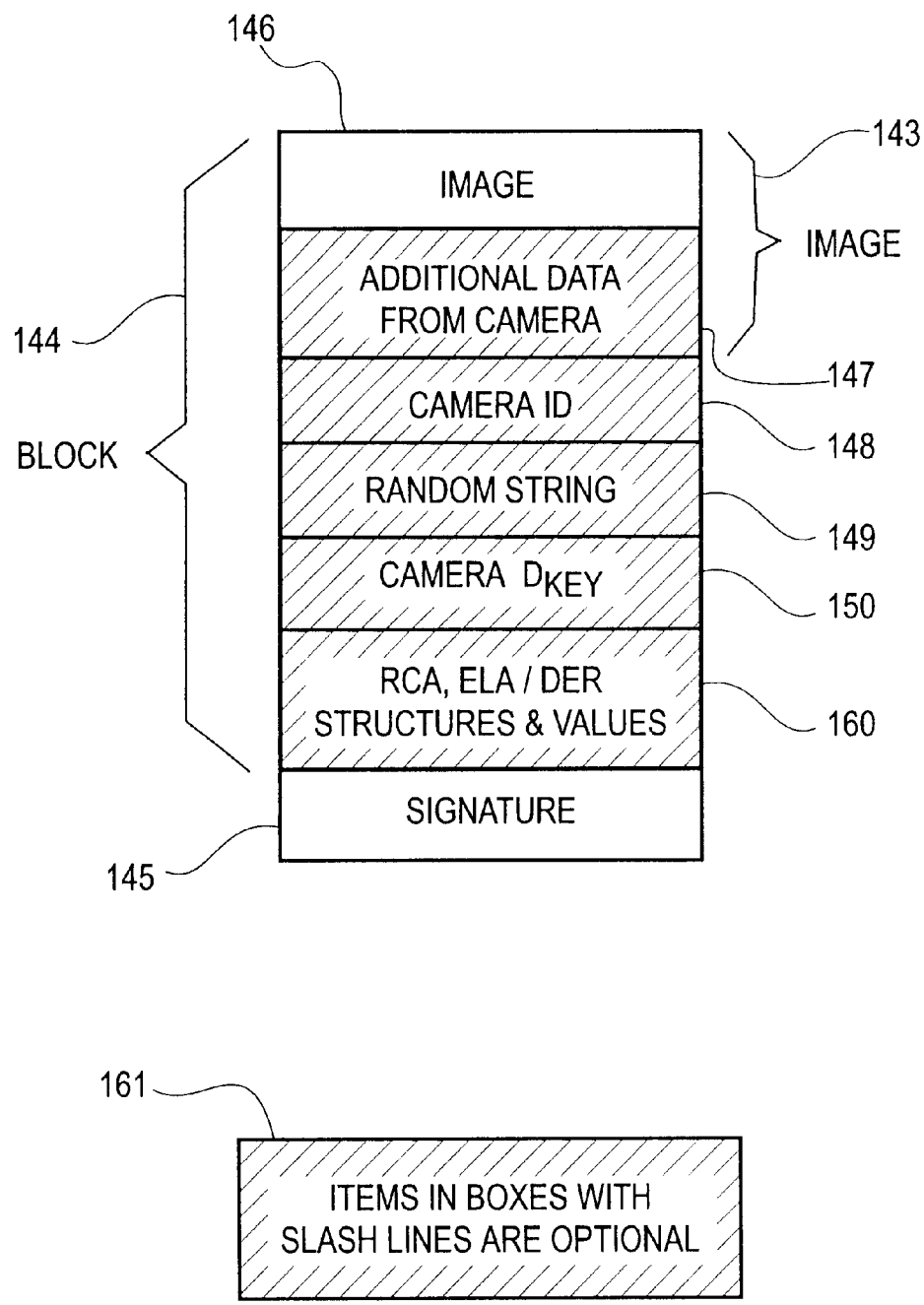
FIG. 7A is a diagram of a file format for a signed digital image.

Referring to FIG. 7A, the files created by the Signa2 process are in a format generally accepted by the industry. Most specifically, the Signa2 files are not proprietary. Additional information is contained within the file, but the addition of the information is in compliance with the standards for the format.

There are two braces in the figure. The first titled "Image" indicates the two elements that are viewable by programs compliant with generally accepted industry formats. Elements outside this brace are not viewable by programs compliant with generally accepted industry formats. The second 144 titled "Block" indicates the elements covered by the signature 145. Everything inside the "Block" is what is signed.

Elements shaded in gray 161 are optional and not required to fulfill the basic purpose of Signa2 devices. A tightly coupled image 146 and signature 145 are the minimum required elements for the Signa2 process. The sensor set 73 acquires the image 146 which is the minimum viewable information. Additional data from the camera 147, viewable by the user, include: Global Positioning System (GPS) information 111; zoom settings; AutoFocus status; the results of the focus quality sampling; roll, pitch and yaw (RPY) values; the compass heading; flash status; File Type; CamID; Seq 120; and Security Value.

The GPS information 111 may include 48 latitude, longitude, altitude, date, time, satellites used in the determination or "NO GPS" 46 if there is a fault 45 with the system. The zoom setting 75 information includes the setting used by the lens 73 for capturing the image expressed either in millimeters with 50 mm being "eye-normal", or in X where 1X is 50 mm. The compass heading 117 includes information on which way the camera was pointing at the time the image was captured.

The flash status 114 information includes the commands, Commanded ON, Commanded OFF, Auto ON or Auto OFF. In the flash status, the first two refer to settings forced by the user and the latter two refer to the user allowing the camera to decide to flash or not and whether it did or not. There may be other options.

The CamId 119 or camera identification code, is set at the factory and part of each image. Examples are SHEP0001 or MOLL0454. Although not required for authentication it does provide a means of determining, at least initial ownership of the device.

Seq 120 is the sequence number for unique image identification, automatically incremented. When used with CamId above BECK5102-98312 uniquely identifies the camera and the picture.

The two Security Values 123 are ImageGuard and NON-VERIFIED. ImageGuard appears if no internal errors are detected and the security is not compromised. NONVERIFIED (or other indication of compromise) appears if security is compromised within the system.

Other segments within the File Structure include Camera ID 148; Random String 149; Camera Decryption Key 150; RCA and ELA/DER structures and values 160; and the digital signature 145. The Camera ID 148 is the unique camera identification, the same as above, but in a section of the file not viewable by the user. The Random String 149 is the current random string and is made part of the file. The Camera Decryption Key 150 is a camera specific decryption key that stays in the camera.

Figure 8:
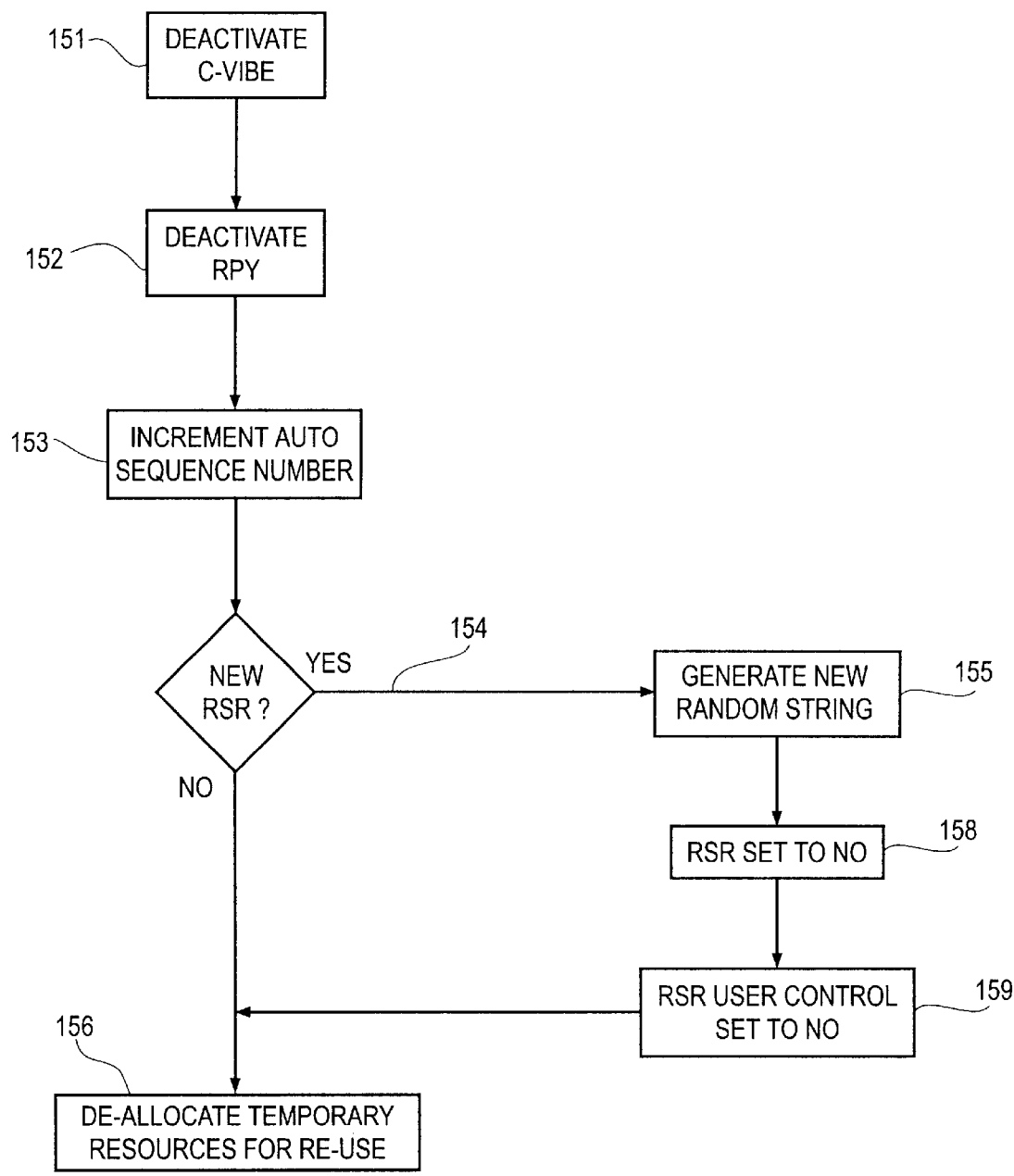
FIG. 8 is a flow chart of the Clean up and Preparation from FIG. 3.

Referring to FIG. 8, this figure illustrates the process for clean up and preparation. In this portion of the process, functions not useful in pre capture operations (see FIG. 4) are deactivated and preparations are made for subsequent image capture. The counter vibration, and the roll, pitch, yaw are deactivated 151, 152 and the image sequence number is incremented 153.

If the "Random String Recording" has been set 79 to YES by the user control 11 the image itself and other information (Referring to FIG. 7A) are used to generate 155 a new random string that replaces the previous random string. The "Random String Recording" 79 is then reset 158 to NO and the user control 11 is set 159 to NO. Temporary resources used by the processor 157 are then deallocated 156 to prepare them for re-use.

It is important to note that the previous random string is used for the image just created. Therefore, frequent resetting of the random string will deter pattern recognition and increase security. This is discussed in the "Role of the random string in increasing the strength of the digital signature" below.

Figure 9:
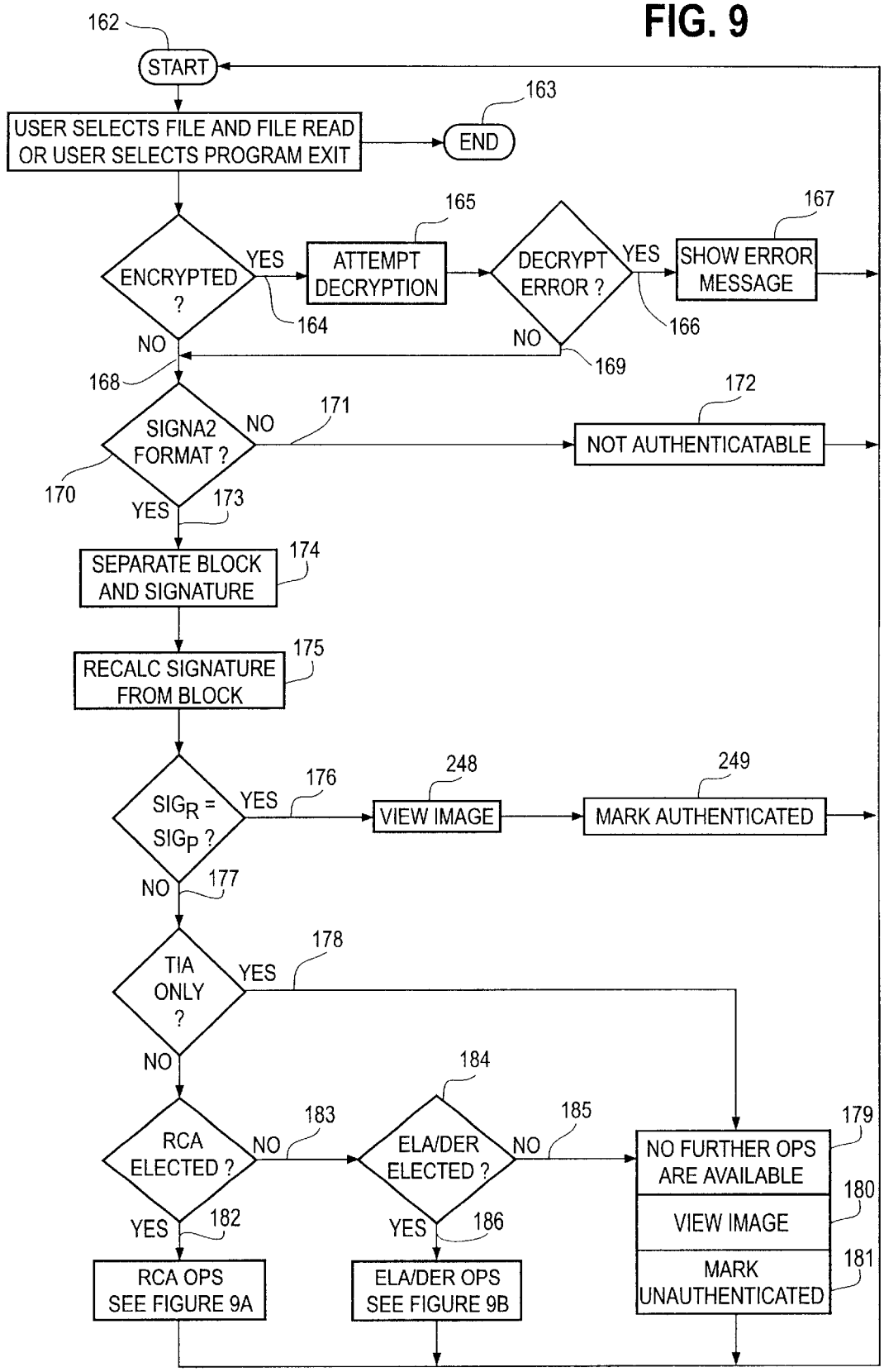
FIG. 9 is a flow chart of the Authentication Sequence.

Referring to FIG. 9, authentication starts with a file believed to contain an image and the additional items (see FIG. 7A) to make the file authenticatable as a Signa2 image. The authentication program must be easily and freely available from a secure public source. Otherwise someone seeking to deceive could provide a faux-authentication program to generate a forced-negative or forced-positive authentication.

The program starts 162 with a self diagnostic to insure that the authentication program itself has not been damaged or corrupted. This self diagnostic is repeated each time processing reaches this 162 point to guard against alterations made after the program has been loaded. Should the self diagnostic fail the program immediately ends with an error message. This self diagnostic procedure and the possibility of a failure are not shown on FIG. 9.

Once the authentication program has been loaded the user is presented with an opportunity to select a file or elect program exit. If the user elects program exit the authentication program ends 163. If an encrypted file is selected 164 an attempt 165 is made to decrypt the file This may require a decryption key obtained from the user or taken from-the file 150. If a decryption error 166 occurs, an error message 167 is displayed and the program cycles back to start 162

If the file was not 168 encrypted or was decrypted without error 169 a test 170 is made to confirm that the file is in the Signa2 format. If the file is not 171 in Signa2 format, the file is not authenticatable 172 and the program cycles back to start 162

If the file is 173 in Signa2 format ,the block 144 is separated 174 from the signature 145 and the signature is recalculated 175 from the original block 144. If the recalculated signature ($SIG_R$) matches 176 the provided signature ($SIG_P$), the image may be viewed 248 and is marked authenticated 249 as a valid image using total image authentication (TIA). The program then cycles back to start 162.

If the two signatures do not match, and the authenticator program has been acquired from a trusted source and is free from alteration; then the image file has been damaged or altered. This is a true-negative, an image properly determined not to be authentic. With an uncompromised authenticator program, a Signa2 image file using TIA level authentication cannot generate false-negatives. The image and the signature are in a single file and altering the file, either intentionally or accidentally; constitutes invalidation and a proper negative authentication.

If the recalculated signature ($SIG_R$) does not 177 match the provided signature ($SIG_P$), a series of tests are made for one of three authentication levels. If only total image authentication (TIA) is available 178 then no further operations are available 179. The image is viewed 180 and marked unauthenticated 181. The program then cycles back to start 162.

Referring to FIG. 9, if row/column authentication (RCA) is 182 elected, processing continues with RCA Operations and the program cycles back to start 162. If row/column authentication (RCA) has not 183 been elected, a 184 test for elemental level authentication/damaged element recovery (ELA/DER) is made.

Figure 9A:
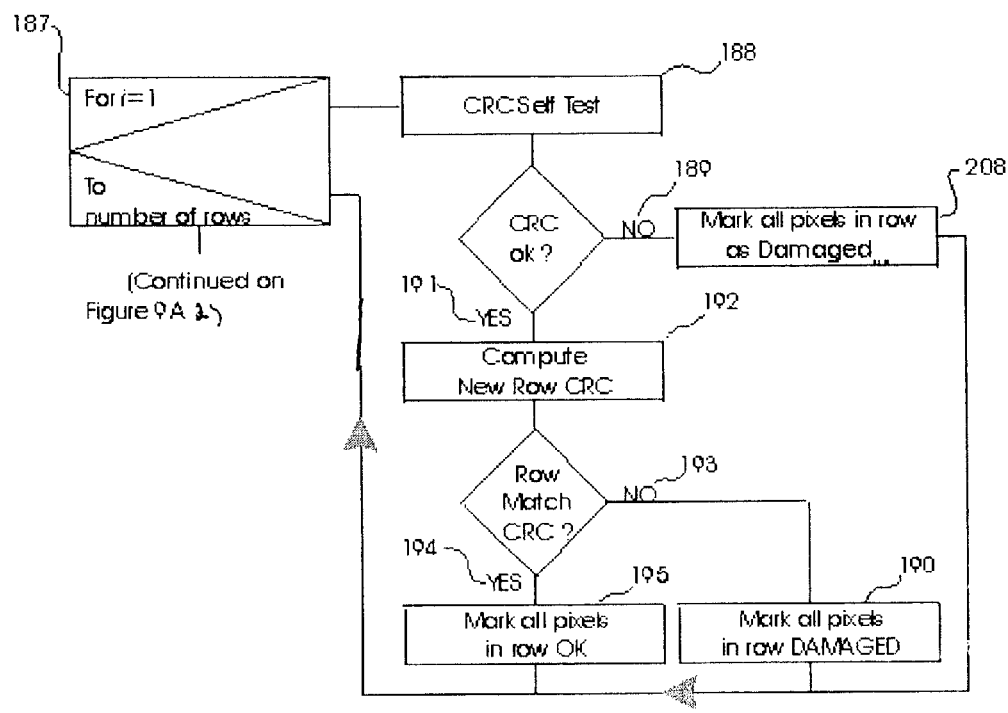
Figures 1, 9B:
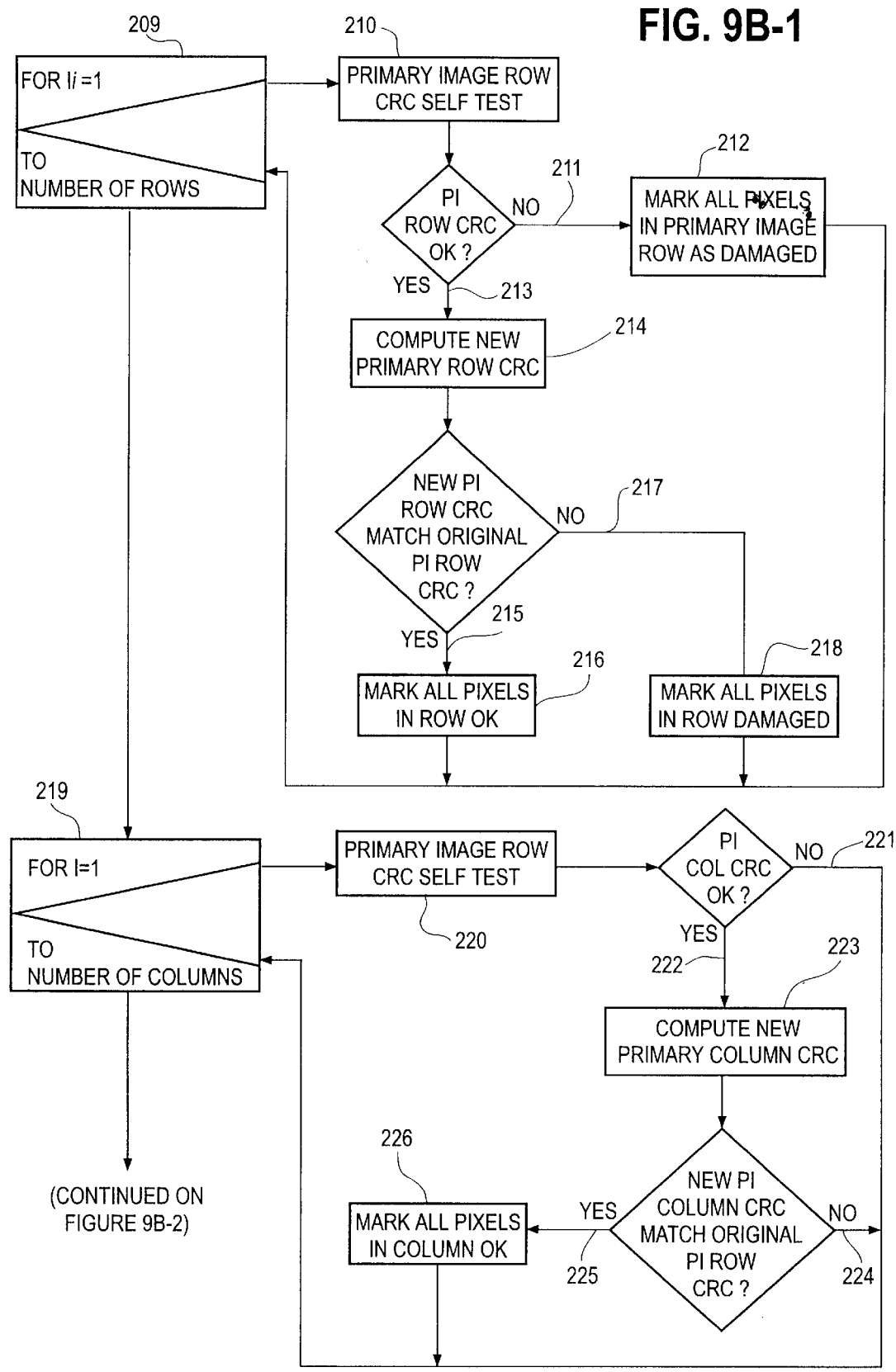
Figures 2, 9B:
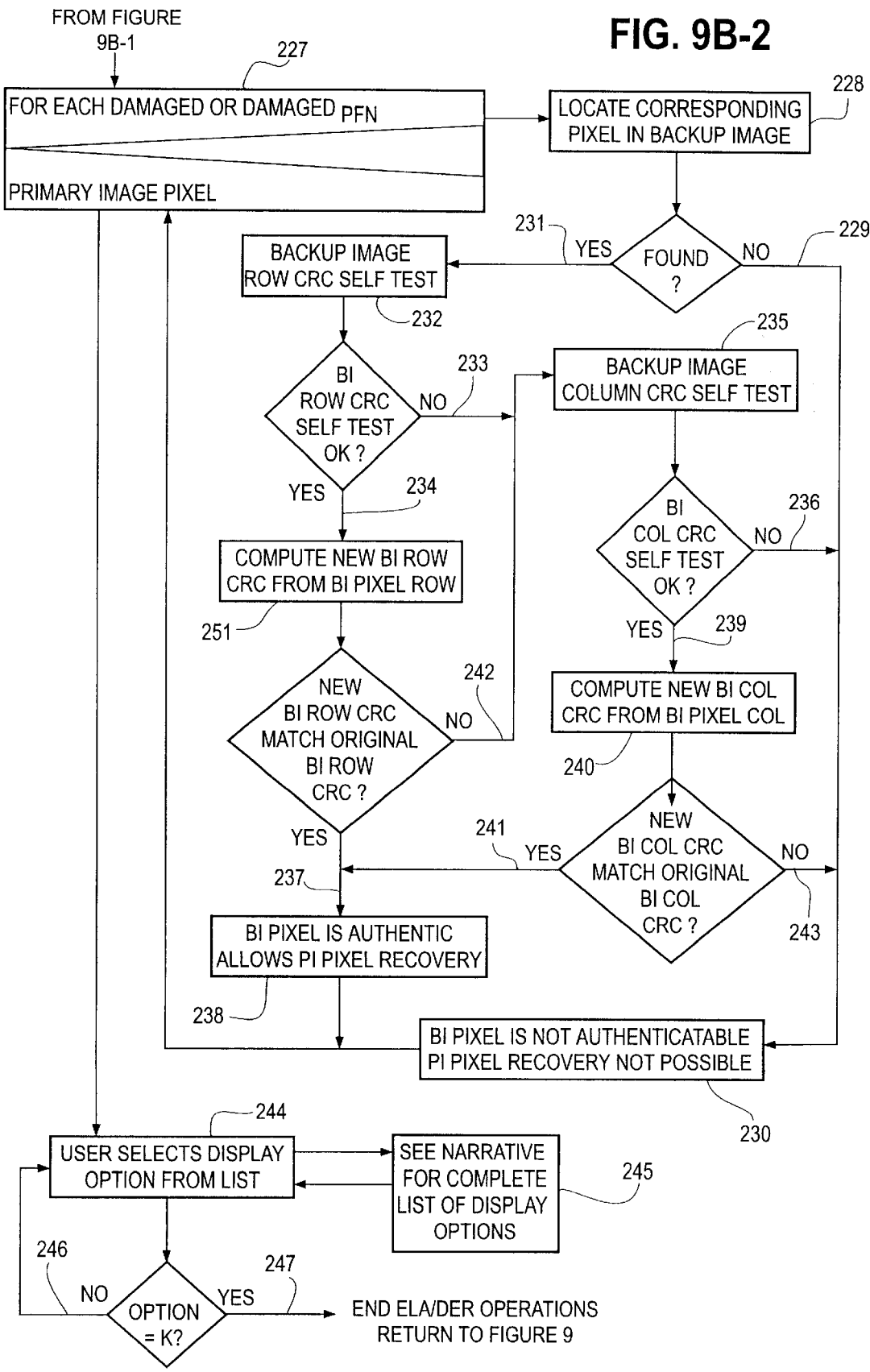

Referring to FIG. 9B1 if ELA/DER has 186 been elected, processing continues with ELA/DER Operations and the program cycles back to start 162. If ELA/DER has not been elected 185 there is an error condition as one of the three levels of authentication (TIA, RCA, ELA/DER) should be available. This error condition is handled by reporting no further operations are available 179. The image is viewed 180 marked unauthenticated 181 and the program cycles back to start 162.

Referring to FIG. 9, row/column authentication (RCA) is elected 182 when a file in a Signa2 format 173 has a signature failure 177. The signature used in comparison 145 is a single signature for the entire file. RCA structures and values 160 provide for a method of detecting errors, not at the whole file level, but at a level for each row and column. Checking each row and column provides two opportunities to detect an error for each pixel.

Cyclic Redundancy Check (CRC) is the method used to describe this form of error detection. There are several varieties of CRC as well as other algorithms for error detection of this type. Although CRC is used here for description purposes, other error detection codes (or error correction codes such as Hamming and Reed-Soloman) may be implemented to augment or replace the CRC error detection code.

Referring to FIG. 9A1 a digital image consists of picture elements, known as pixels, arranged in a matrix of rows and columns. RCA Operations commence by stepping 187 through each row of the image testing 188 the CRC for internal integrity. Although CRCs do not contain an inherent internal integrity test, part of the RCA structures include additional values to test the CRC. If the CRC fails 189 this self test, all pixels in that row are marked as damaged, but potentially false negatives (PFN) 208.

If the CRC itself is ok 191 the entire row of pixels is used to compute 192 a new CRC for the row. This new CRC is compared to the original CRC. If they do not 193 match, all of the pixels in the row are marked as damaged 190. If the new CRC does 194 match the original CRC, all of the pixels in the row are marked 195 ok.

Referring to FIG. 9A2 RCA operations continue by stepping 196 through each column of the image and testing 197 the CRC of each column for internal integrity. If the CRC fails 198 this test, no further operations are conducted on the column of pixels. If the CRC itself is ok 200 the entire column of pixels is used to compute 201 a new CRC for the column. If the new CRC does not 202 match the original CRC, no further operations are conducted on this column. If the new CRC does 203 match the original CRC, all of the pixels in the column are marked 204 ok.

A pixel may be marked in one of six ways: Ok—ok from row CRC 195 and column CRC 204; Damaged—ok from row CRC 190 and column CRC 204; Damaged$_{PFN}$—ok from row CRC failure 189 208 and column CRC 204; Ok—null from row CRC 195; Damaged—null from row CRC 190; and Damaged$_{PFN}$—null from row CRC failure 208. There is no second status because of column CRC failure 202.

The nature of the two operations (row and column) generate a matrix where some rows of pixels may be marked as damaged in the row operations and some of those pixels changed from damaged to ok by the column operations. This is because an entire row is marked damaged or ok. If a column is marked ok, the pixels that may have been marked damaged as part of a whole row were not in fact damaged and are changed to being ok. As an example, a single damaged pixel would cause a whole row to be marked as damaged in row operations. Column operations would mark every column ok except the column that had the damaged pixel. The end result is an image with a single pixel marked damaged.

Once the image has been authenticated the user selects 199 from a list of presented display options 205. The display options are: Option A—Display only the original image without any modification; Option B—Display the original image with damaged pixels forced to white; Option C—Display the original image with damaged pixels forced to black; Option D—Rock A and B; Option E—Rock A and C; Option F —Statistical Report; and Option G—End display options. "Rocking" refers to rapidly displaying two alternating images.

The statistical report under Option F contains the following elements: F1 contains the total number of pixels in the image. F2 contains the total number of pixels marked ok—ok, Damaged—ok, Damaged$_{PFN}$—ok and ok—null, expressed as a number, and as a relative percent of the total number of pixels (F2/F1)*100 known as the "Undamaged Percentage."

Ok—ok pixels passed both row 194 and column 203 CRC test. Ok—null pixels passed the row 194 CRC test, but the column CRC was damaged 198 and provided no additional information. Damaged—ok pixels were not actually damaged. The pixels were marked damaged because the new row CRC did not match 193 the original row CRC, and the whole row was marked 190 damaged even though the pixels passed 203 the column CRC test Darnaged$_{PFN}$—ok also contains pixels that were not actually damaged. The pixels were marked damaged due to the row CRC failure 189 that caused the entire row to be marked Damaged$_{PFN}$ even though the pixels passed 203 the column CRC test.

F3 contains the total number of pixels marked Damaged—null expressed as a number, and as a relative percent of the total number of pixels in the image (F3/F1) *100 known as the "True Negative Percentage." The pixels were marked Damaged-null because the new row CRC did not match the original row CRC test 193. There is no second status because of column CRC failure 202.

F4 contains the total number of pixels marked Damaged$_{PFN}$—null expressed as a number, and as a relative percent of the total number of pixels in the image (F4/F1) *100 known as the "Potential False Negative Percentage." The pixels were marked Damaged$_{PFN}$—null because the row CRC failed 189 208 the self test and the pixel could not be authenticated as ok due to column CRC failure 202. The sum of the relative percents of F2 F3 and F4 should equal 100%, and the sum of F2 F3 and F4 should equal F1.

The user may continue to select 206 alternate display options until they elect to end display options 207. At that point RCA operations are concluded.

Referring to FIG. 9B1, ELA/DER Operations occur when a file in Signa2 format 173 has a signature failure 177 and both element level authentication (ELA) and damaged element recovery (DER) authentication are elected 186. The signature used in comparison 145 is a single signature for the entire file. ELA/DER structures and values 160 provide for a method of determining authentication, not at the whole file level, but at a level for each element.

The ELA/DER structure includes a complete duplicate of the image, compressed and encoded. It is this duplicate image that allows for elemental level authentication and damaged element recovery. In the description below the original version of the image, the one the user can see, is referred to as the "Primary Image", abbreviated PI. The compressed and encoded version of the image is referred to as the "Backup Image", abbreviated BI. Both the Primary Image and the Backup Image have row and column CRCs, or other error detection protocols.

Referring to FIG. 9B1 initially each row 209 of the primary image (PI) is stepped through and a self test 210 is performed on each primary image row CRC. If the CRC fails 211the self test, all of the pixels in the primary image row are marked 212 Damaged$_{PFN}$ as potential false negative damaged pixels. If the primary image row CRC passes 213 the self test, a new primary row CRC is computed 214 from the pixels in the primary image row. If the new primary image row CRC matches 215 the original primary row CRC, all the pixels in the row are marked 216 as ok (undamaged). If the new primary image row CRC does not 217 match the original primary row CRC, all the pixels in the row are marked 218 as damaged.

Referring to FIG. 9B2, once the row-wise process is complete, each column 219 of the primary image is stepped through with a self test 220 performed on the primary image column CRC. If the CRC fails the self test 221 no further operations are conducted on this column. If the primary image column CRC passes 222 the self test, a new primary column CRC is computed 223 from the pixels in the primary image column. If the new primary image column CRC matches 225 the original primary image column CRC, all of the pixels in that column are marked 226 ok. If the new primary image column CRC does not 224 match the original primary image column CRC, no further operations are conducted on this column.

Each pixel may be marked in one of six ways: Ok—ok from row CRC 216 and column CRC 226; Damaged—ok from,row CRC 218 and column CRC 226; Damaged$_{PFN}$— ok from row CRC failure 212 and column CRC 226; Ok—null from row CRC 216; Damaged—null from row CRC 218; and Damaged$_{PFN}$—null from row CRC failure 212. There is no second status because of column CRC failure 221

Referring to FIG. 9B3 authentication then starts on each damaged or damaged$_{PFN}$ pixel with attempts to recover the original value of that element. Additional processing efforts are not made to distinguish between true negatives and false negatives due to the fact that the same damaged element recovery (DER) procedures are used on each.

To recover the value of a damaged primary image pixel the corresponding backup image pixel must first be located and validated. Validation of the corresponding backup image pixel can occur under either of the two scenarios. In the first scenario, the backup image ROW CRC for the corresponding backup image pixel is undamaged and the computed backup image ROW CRC matches the original backup image ROW CRC. In the second scenario, the backup image COLUMN CRC for the corresponding backup image pixel is undamaged and the computed backup image COLUMN CRC matches the original backup image COLUMN CRC.

Stepping 227 through each damaged or damaged$_{PFN}$ pixel in the primary image is done to locate 228 the corresponding pixel in the backup image. The backup-image will require decompression first. If the corresponding backup image pixel cannot 229 be located, it cannot be authenticated and it is not possible to recover the value of the primary image pixel 230. Once the corresponding backup image pixel is 231 located, a self test 232 is performed on the backup image ROW CRC.

If the backup image ROW CRC self test fails 233 the backup image ROW CRC is damaged and is unusable for authentication. The backup image COLUMN CRC for the corresponding backup image pixel is then used for authentication and a self test 235 of the backup image COLUMN CRC is performed.

If the backup image COLUMN CRC for the corresponding backup image pixel fails 236 the self test, the corresponding backup image pixel cannot be authenticated and it is not possible to recover the value of the primary image pixel 230. If the backup image COLUMN CRC for the corresponding backup image pixel passes 239 the self test then a new backup image COLUMN CRC is computed 240.

If the new backup image COLUMN CRC matches 241 the original backup image COLUMN CRC 238 the corresponding backup image pixel is authentic and can be used to recover the value of the damaged or damaged$_{PFN}$ primary image pixel. If the new backup image COLUMN CRC does not match 243 the original backup image COLUMN CRC, the corresponding backup image pixel cannot be authenticated and it is not possible to recover the value of the primary image pixel 230.

If the backup image ROW CRC self test succeeds 234 a new backup image ROW CRC is computed 251. If the new backup image ROW CRC matches 237 the original backup image ROW CRC then 238 the corresponding backup image pixel is authentic and can be used to recover the value of the damaged or damaged$_{PFN}$ primary image pixel. If the new backup image ROW CRC does not 242 match the original backup image ROW CRC, one or more of the backup image pixels in that row is damaged and the backup image column must be tested for authentication.

A self test 235 of the backup image COLUMN CRC is performed. If the backup image COLUMN CRC for the corresponding backup image pixel fails 236 the self test, the corresponding backup image pixel cannot be authenticated and it is not possible to recover the value of the primary image pixel 230. If the backup image COLUMN CRC for the corresponding backup image pixel passes 239 the self test then a new backup image COLUMN CRC is computed 240.

If the new backup image COLUMN CRC matches 241 the original backup image COLUMN CRC 238 the corresponding backup image pixel is authentic and can be used to recover the value of the damaged or damaged$_{PFN}$ primary image pixel.

If the new backup image COLUMN CRC does not match 243 the original backup image COLUMN CRC then the corresponding backup image pixel cannot be authenticated and it is not possible to recover the value of the primary image pixel 230.

Each pixel may then be marked in one of eight ways: Ok—ok, from row CRC 216 and column CRC 226; Damaged—ok, from row CRC 218 and column CRC 226; Damaged$_{PFN}$—ok, from row CRC failure 212 and column CRC 226; Ok—null, from row CRC 216; Damaged—null—recovered, from row CRC 218 (The original value of the pixel was recovered 238); Damaged—null—not recovered, from row CRC 218 (the original value of the pixel was not 230 recovered); Damaged$_{PFN}$—null—recovered, from row CRC failure 212 (the original value of the pixel was recovered 238); and Damaged$_{PFN}$—null—not recovered, from row CRC failure 212 (the original value of the pixel was not 230 recovered). Damaged—null and Damaged$_{PFN}$—null are replaced with the results of the recovery efforts Referring to FIG. 9B4 once the authentication and recovery operations are completed the user is presented 244 with a list of eleven presented display options 245. Option A display only the original image without any modification Option B display the original image with damaged and damaged$_{PFN}$ pixels forced to white. Option C display the original image with damaged and damaged$_{PFN}$ pixels forced to black. Option D display the original image with damaged and damaged$_{PFN}$ pixels replaced with recovered pixels. Unrecovered damaged and damaged$_{PFN}$ pixels are forced to white. Option E display the original image with damaged and dam aged$_{PFN}$ pixels replaced with recovered pixels. Unrecovered damaged and damaged$_{PFN}$ pixels are forced to black.

Rapidly displaying two alternating images is known as "rocking." Option F rocks between A and B. Option G rocks between A and C. Option H rocks between A and D. Option I rocks between A and E.

Option J displays the Statistical Report containing the various elements. This option displays the total number of pixels in the image J1. It also displays the total number of pixels marked ok—ok, Damaged—ok, Damaged$_{PFN}$—ok and ok—null, expressed as a number, and as a relative percent of the total number of pixels (J2/J1)*100 known as the "Undamaged Percentage" J2. Ok—ok pixels are those that passed both row 216 and column 226 CRC test. Ok—null pixels are those that passed the row 216 CRC test, but the column CRC was damaged 221 and provided no additional information. Damaged—ok pixels are those that were not actually damaged. The pixels were marked damaged because the new row CRC did not match 217 the original row CRC and the whole row was marked 218 damaged. These pixels passed 225 the column CRC test. Damaged$_{PFN}$—ok pixels were those that were not actually damaged. The pixels were marked damaged$_{PFN}$ because of row CRC failure 211 caused the entire row to be marked 212 Damaged$_{PFN}$. The pixels passed 225 the column CRC test.

Option J also displays the total number of damaged—null—recovered pixels as a number, and as a relative percent of the total number of pixels (J3/J1)*100 known as the "Damaged and Recovered Percentage" J3. The total number of damaged —null—not recovered pixels are also displayed as a number and as a relative percent of the total number of pixels (J4/J1)*100 known as the "Damaged and Not Recovered Pecentage" J4.

Option J displays the total number of damaged$_{PFN}$—null—recovered pixels as a number and as a relative percent of the total number of pixels (J5/J1)*100 known as the "Damaged$_{PFN}$ and Recovered Pecentage" J5. It also displays the total number of damaged$_{PFN}$—null—not recovered pixels as a number and as a relative percent of the total number of pixels (J6/J1)*100 known as the "Damaged$_{PFN}$ and Not Recovered Pecentage" J6. The sum of J2 J3 J4 J5 and J6 should equal J1, and the sum of the relative percents of J2 J3 J4 J5 and J6 should equal 100%.

The final option that may be selected is Option K to end display options. The user may continue to select 246 alternate display options until they elect to end display options 247. At that point ELA/DER operations are concluded.

The following is information on True Negatives, False Negatives and False. Positives using row/column authentication (RCA) given that an authenticator program has been acquired from a trusted source and is free from alteration.

If a pixel is damaged (altered from its original state) and this damage is detected by the RCA operations then the pixel is a true-negative, part of an image properly determined not to be authentic. Using RCA it is possible to generate a false negative, that is where a pixel is in fact authentic, but is being marked as damaged.

There are eight possible cases of pixel authenticity/damage, row CRC authenticity/damage, and column CRC authenticity/damage.

| Case | A | B | C | D | E | F | G | H |
|---|---|---|---|---|---|---|---|---|
| Pixel Damaged | N | Y | N | N | Y | Y | N | Y |
| Row CRC Damaged | N | N | Y | N | Y | N | Y | Y |
| Col CRC Damaged | N | N | N | Y | N | Y | Y | Y |

Y = damaged
N = not damaged or ok

The number of possibilities can be expressed as $$\frac{\text{(The number of elements)!}}{\text{(Number of identical elements)!}}$$

There are three elements in all cases. Case A is the case in which none of the three items are damaged. There is the single case with zero Y and three N. (3!/3!=1) Cases B through D are the cases in which a single item of the three are damaged. There are three cases with one Y and two N. (3!/2!=3.) Cases E through G are the cases in which two of the three items are damaged. There are three cases with two Y and one N.(3!2!=3.) Case H is the case in which three of the three items are damaged.; There is one case with three Y and zero N (3!/3!=1.)

Only in case G where both the row CRC and column CRC are damaged, and the pixel is not damaged, would a false negative be generated. Failure 189 of the row CRC self test would cause all the pixels in the row to be marked damaged$_{PFN}$ 190. The column. CRC would also fail 198 the column CRC self test and the pixel would remain marked as damaged$_{PFN}$. In case H, both the row CRC and column CRC are damaged and would appear to mimic case. G, except that this is not a false negative because the pixel is also damaged.

Using the same table it can be shown that a false positive (a damaged pixel being improperly authenticated as undamaged) is not a possible condition. Cases B, E, F, and H have damaged pixels. In case B, the row CRC is undamaged and the newly computed 192 row CRC would not 193 match the original row CRC. Thus all pixels in the row would be marked 190 as damaged. In case B the column CRC is also undamaged. The computed new column CRC 201 would not 202 match the original CRC and the pixels in the column marked as damaged would remain marked as damaged. Only if the new column CRC matches the original column CRC 203 would all the pixels in the column, including the damaged one, be marked 204 as ok.

In case E, the row CRC is damaged and it would fail 189 the row CRC self test 188 causing all pixels in the row to be marked 208 as damaged$_{PFN}$. The column CRC is undamaged and would pass 200 the column CRC self test. The new column CRC would not 202 match the original CRC and the pixels in the column marked as damaged$_{PFN}$ would remain marked as damaged due to the fact that when a row CRC is damaged, the row of pixels is marked as "damaged potential false negative" or damaged$_{PFN}$. Only if the new column CRC matches the original column CRC 203 would all the pixels in the column, including the damaged one, be marked 204 as ok.

In case F, the row CRC is undamaged and would pass 191 the row CRC self test 188. The newly computed row CRC 192 would not match 193 the original row CRC causing all of the pixels in the row to be marked 190 damaged. In case F, the column CRC is damaged and it would not 198 pass the CRC self test and the pixels in the column marked as damaged would remain marked as damaged.

In case H, the row CRC is damaged and would fail 189 the row CRC self test 188 causing all pixels in the row to be marked 208 as damaged$_{PFN}$. In case H, the column CRC is damaged and would not 198 pass the CRC self test. The pixels in the column marked as damaged$_{PFN}$ would remain marked as damaged$_{PFN}$ due to the fact that when a row CRC is damaged, the row of pixels is marked as "damaged potential false negative" or damaged$_{PFN}$.

Under RCA, false positives, a damaged, pixel being improperly authenticated as undamaged, cannot occur if the authenticator program has been acquired from a trusted source and is free from alteration The following is information on True Negatives, False Negatives and False Positives using element level authentication (ELA) with damaged element recovery (DER). If a pixel is damaged (altered from its original state) and the damage is detected by the ELA operations then the pixel is a true-negative, part of an image properly determined not to be authentic. Using ELA it is possible to generate a false-negative, that is where a pixel is in fact authentic, but is being marked as damaged.

There are sixty-four (64) possible cases of primary image pixel authenticity/damage, backup image pixel authenticity/damage, primary row CRC authenticity/damage, backup row CRC authenticity/damage, primary column authenticity/damage, and backup column CRC authenticity/damage.

In table form these cases are

Y=damaged N=not damaged or ok

| Group 1 Primary Image pixel is authentic and Backup Image pixel is authentic | | | | | | | | | | | | | | | | |
|---|---|---|---|---|---|---|---|---|---|---|---|---|---|---|---|---|
| Case | A1 | B1 | C1 | D1 | E1 | F1 | G1 | H1 | I1 | J1 | K1 | L1 | M1 | N1 | O1 | P1 |
| Primary Image Pixel | N | N | N | N | N | N | N | N | N | N | N | N | N | N | N | N |
| Backup Image Pixel | N | N | N | N | N | N | N | N | N | N | N | N | N | N | N | N |
| Primary-Row CRC | N | Y | N | N | N | Y | Y | Y | N | N | N | Y | Y | Y | N | Y |
| Backup-Row CRC | N | N | Y | N | N | Y | N | N | Y | Y | N | Y | Y | N | Y | Y |
| Primary-Column CRC | N | N | N | Y | N | N | Y | N | Y | N | Y | Y | N | Y | Y | Y |
| Backup-Column CRC | N | N | N | N | Y | N | N | Y | N | Y | Y | N | Y | Y | Y | Y |

-continued

Group 2 Primary Image pixel is damaged and Backup Image pixel is authentic

| Case | A2 | B2 | C2 | D2 | E2 | F2 | G2 | H2 | I2 | J2 | K2 | L2 | M2 | N2 | O2 | P2 |
|---|---|---|---|---|---|---|---|---|---|---|---|---|---|---|---|---|
| Primary Image Pixel | Y | Y | Y | Y | Y | Y | Y | Y | Y | Y | Y | Y | Y | Y | Y | Y |
| Backup Image Pixel | N | N | N | N | N | N | N | N | N | N | N | N | N | N | N | N |
| Primary-Row CRC | N | Y | N | N | N | Y | Y | Y | N | N | N | Y | Y | Y | N | Y |
| Backup-Row CRC | N | N | Y | N | N | Y | N | N | Y | Y | N | Y | Y | N | Y | Y |
| Primary-Column CRC | N | N | N | Y | N | N | Y | N | Y | N | Y | Y | N | Y | Y | Y |
| Backup-Column CRC | N | N | N | N | Y | N | N | Y | N | Y | Y | N | Y | Y | Y | Y |

Group 3 Primary Image pixel is authentic and Backup Image pixel is damaged

| Case | A3 | B3 | C3 | D3 | E3 | F3 | G3 | H3 | I3 | J3 | K3 | L3 | M3 | N3 | O3 | P3 |
|---|---|---|---|---|---|---|---|---|---|---|---|---|---|---|---|---|
| Primary Image Pixel | N | N | N | N | N | N | N | N | N | N | N | N | N | N | N | N |
| Backup Image Pixel | Y | Y | Y | Y | Y | Y | Y | Y | Y | Y | Y | Y | Y | Y | Y | Y |
| Primary-Row CRC | N | Y | N | N | N | Y | Y | Y | N | N | N | Y | Y | Y | N | Y |
| Backup-Row CRC | N | N | Y | N | N | Y | N | N | Y | Y | N | Y | Y | N | Y | Y |
| Primary-Column CRC | N | N | N | Y | N | N | Y | N | Y | N | Y | Y | N | Y | Y | Y |
| Backup-Column CRC | N | N | N | N | Y | N | N | Y | N | Y | Y | N | Y | Y | Y | Y |

Group 4 Primary Image pixel is damaged and Backup Image pixel is damaged

| Case | A4 | B4 | C4 | D4 | E4 | F4 | G4 | H4 | I4 | J4 | K4 | L4 | M4 | N4 | O4 | P4 |
|---|---|---|---|---|---|---|---|---|---|---|---|---|---|---|---|---|
| Primary Image Pixel | Y | Y | Y | Y | Y | Y | Y | Y | Y | Y | Y | Y | Y | Y | Y | Y |
| Backup Image Pixel | Y | Y | Y | Y | Y | Y | Y | Y | Y | Y | Y | Y | Y | Y | Y | Y |
| Primary-Row CRC | N | Y | N | N | N | Y | Y | Y | N | N | N | Y | Y | Y | N | Y |
| Backup-Row CRC | N | N | Y | N | N | Y | N | N | Y | Y | N | Y | Y | N | Y | Y |
| Primary-Column CRC | N | N | N | Y | N | N | Y | N | Y | N | Y | Y | N | Y | Y | Y |
| Backup-Column CRC | N | N | N | N | Y | N | N | Y | N | Y | Y | N | Y | Y | Y | Y |

In order to be a false negative: (1) the primary image pixel must be, in fact, undamaged (N); (2) initial operations must improperly indicate that the primary image pixel is damaged; and (3) all subsequent operations must fail to correct that improper indication.

The factor that in a false negative the primary image pixel must be, in fact, undamaged (N) limits the results to Group 1 and Group 3. The primary row CRC must be damaged (Y) to initially mark a row of PI pixels as damaged$_{PFN}$. If the ROW CRC is undamaged and the row of pixels is undamaged, then pixel will be marked ok. This is not a negative, false or otherwise and limits the results to cases B, F, G, H, L, M, N and P in Group 1 and Group 3.

The primary column CRC must be damaged (Y) to preclude the correction of a pixel marked damaged by a damaged row CRC. In cases B, F, H, and M, the primary column CRC is undamaged (N) which would correct the improper identification of the pixel as damaged$_{PFN}$ limiting the results to cases G, L, N and P in Group 1 and Group 3.

The backup row CRC must be damaged (Y) to preclude correction. In cases G and N, the backup row CRC is undamaged (N) and would correct the improper identification of the pixel as damaged limiting the results to case L and P in Group 1 and Group 3.

The backup column CRC must be damaged (Y) to preclude correction. In case L, the backup column CRC is not damaged (N) and would correct the improper identification of the pixel as damaged$_{PFN}$. In case P1 the backup image pixel is also authentic, but because of the damage to all of the error detection structures (primary crow CRC, primary column CRC, backup row CRC and backup column CRC) it cannot be validated as authentic. Only in cases P1 and P3 could an authentic pixel be marked damaged without the possibility of correction.

Using the same tables it can be shown that a false positive (a damaged pixel being improperly authenticated as undamaged) is not a possible condition. Group 2 and, Group 4 both contain damaged primary image pixels. If the primary row CRC is damaged, all pixels in the, row are marked damaged. If the primary row CRC is undamaged, the new row CRC will not match the provided row CRC and all pixels in the row will be marked damaged. For the purposes of isolating a case of false positive, it does not matter if the primary row CRC is damaged (Y) or not (N). The pixel will be marked as damaged or damaged$_{PFN}$. Again, the primary image ROW CRC alone guarantees that a damaged pixel will be marked damaged or, damaged$_{PFN}$.

To be a false positive all detective and corrective mechanisms must fail in a mode to change the primary row CRC determination that the pixel is damaged or darnmaged$_{PFN}$. If the primary column CRC is damaged 221 it will not change the determination that a pixel is damaged. If the primary column CRC is undamaged 222 the new PI COLUMN CRC will not match the original PI COLUMN CRC. Thus, it will not change the determination that a damaged pixel is damaged. For the purposes of isolating a case of false positive it does not matter if the primary column CRC is damaged (Y) or not (N). The damage pixel will remain marked as damaged.

Backup row and column CRCs are used for damaged element recovery, not element level authentication. Thus, for the purposes of isolating a case of false positive it does not matter if the backup row CRC is damaged (Y) or not (N), and it does not matter if the backup column CRC is damaged (Y) or not (N). The damaged pixel will remain marked as damaged.

This eliminates all cases in Group 2 and Group 4 as possible sources of a false positive condition. As no other cases remain for consideration, false positives are not possible if the authentication program is free from unauthorized alteration.

Using the same tables we can determine if a damaged pixel can or cannot be recovered from the damaged element recovery structures. To be considered for recovery a primary image pixel must be either, in fact damaged or a false-negative (a pixel marked damaged that is, in fact, undamaged). This limits consideration to damaged pixels in Groups 2 and 4 and cases P1 and P3 for the two possible false-negative situations.

The backup image pixel must be, in fact, undamaged. All Group 4 cases where the BI pixel is damaged are not recoverable due to the fact that all false positives are not possible. The backup image control structures must authenticate it the BI pixel as undamaged. The backup row CRC can be damaged which would lead to the backup image pixel being improperly considered damaged. If the backup column CRC were undamaged, it would correct the improper designation of the backup image pixel as damaged.

An undamaged backup row CRC would indicate that the backup image pixel is undamaged. A damaged backup column CRC would not change the determination of the backup row CRC that the backup image pixel is undamaged. Thus, as long as either the backup image row CRC or backup image column CRC are undamaged, an undamaged backup image pixel can be authenticated and used to recover the damaged primary image pixel. Only in cases J2 M2, O2 and P2 are both the backup image CRC structures damaged and unable to authenticate the undamaged backup image as undamaged.

In the false positive cases of P1 and P3 both of the backup CRC structures are damaged and unable to authenticate the undamaged backup image as undamaged. Therefore, in all 16 cases of Group 4 cases J2 M2, O2 and P2,a damaged primary image pixel cannot be recovered. If P1 or P3 generates a false negative, the improperly identified damaged primary image pixel cannot be recovered.

The following is information on the role of the random string in increasing the strength of the digital signature. A series of examples and explanations shows how the use of one time and random elements increase the resistance of a digital signature to successful fraudulent impersonation.

Starting with a blank image and a constant signature algorithm, any true image could be altered to blank and the signature from a truly blank image could be added. The resulting altered image would be improperly validated as authentic with little effort. Clearly this is a weaker situation and an undesirable outcome as the same image generates the same signature.

In the adaptive signature, a signature is generated from the contents of the image. In the case of a blank image, the same signature would be generated. An image could be manipulated to blank and the signature duplicated from a properly signed blank image. This would allow the improper validation as authentic in a manner similar to the preceding with the same undesirable outcome.

An example of an adaptive signature is one that contains a one-time element. The addition of a one-time element allows for differing signatures even if the image itself is blank. One-time elements are never repeated such as date-time or image sequence number. Some convolution or manipulation of these one-time elements is desirable to preclude their easy forgery. This is a stronger solution as the same image generates differing signatures.

An adaptive signature may also be a signature that contains one-time elements and random elements. A "random string" is a sequence of characters generated from many variables including selected values from a previous image. The algorithm to create the random string is a trade secret and may differ from device to device even among the same production run of otherwise identical devices. The algorithm used may also vary from use to use of the same device. Two blank images captured a second apart with the same device can generate two widely different signatures. Two blank images captured at the exact same moment by two different devices can generate two widely different signatures. This creates a stronger solution than the adaptive signature containing only a one-time element.

Another variation is an adaptive signature with a one-time element and a one-time random element. The user has control over how often a new random string is created. If the random string were created anew after each image was captured, then pattern recognition of the resulting signature from the image is not possible as random elements are, by definition, not patterned. Unless the signature generation protocol and the random string generation algorithm were known or reverse engineered, the ability to sign a properly constituted Signa2 image resides solely inside the Signa2 devices. By varying the random string generation protocol between devices, varying between protocols between use to use of the same device, and regenerating the random string frequently, analysis of the results to determine the process (a form of reverse engineering) is an almost fruitless exercise.

While the invention has been illustrated and described in detail in the drawings and foregoing description, the same is considered as illustrative and not restrictive in character, it being understood that all changes and modification that come within the spirit of the invention are desired to be protected.

What is claimed is

1. A method for authenticating a data stream stored in a data file in memory, said method comprising the steps of:

storing a data stream in a data file in a memory;

utilizing a sensor, which is tightly coupled to said memory, to generate at least one internal and unique parameter;

monitoring the integrity of the tight coupling between said memory and said sensor when said at least one internal and unique parameter is generated, and, if said integrity is compromised, then also providing an indication of said compromised integrity;

utilizing a signature protocol to generate a first signature based on said data stream and said at least one parameter, said first signature being generated without altering said data stream and being appended to said data file in said memory;

utilizing said signature protocol to generate a second signature based on said image;

comparing said first signature to said second signature,
if said first and second signatures are not the same, then generating an error signal that is displayed to a user to indicate that said stored data stream is not authentic, and
if said first and second signatures are the same, then generating an ok signal that is displayed to a user to indicate that said stored data stream is authentic.

2. The method of claim 1, wherein said memory form a part of a digital camera.

3. The method of claim 1, wherein said at least one parameter comprises a random number.

4. The method of claim 1, further comprising the step of appending at least one additional parameter to said data file in said memory, said at least one additional parameter being generally representative of a condition under which said data stream was generated.

5. The method of claim 4, wherein said at least one additional parameter is selected from a group consisting of: GPS coordinates, zoom settings, AutoFocus status, focus quality sampling, roll, pitch and yaw values, compass headings, flash status, CamID, Seq, and a Security Value.

6. The method of claim 1 wherein said data stream is a digit sample of an environment.

* * * * *